United States Patent [19]
Andersen et al.

[11] Patent Number: 5,580,624
[45] Date of Patent: Dec. 3, 1996

[54] FOOD AND BEVERAGE CONTAINERS MADE FROM INORGANIC AGGREGATES AND POLYSHACCARIDE, PROTEIN, OR SYNTHETIC ORGANIC BINDERS, AND THE METHODS OF MANUFACTURING SUCH CONTAINERS

[75] Inventors: Per J. Andersen; Simon K. Hodson, both of Santa Barbara, Calif.

[73] Assignee: E. Khashoggi Industries, Santa Barbara, Calif.

[21] Appl. No.: 407,037

[22] Filed: Mar. 17, 1995

Related U.S. Application Data

[63] Continuation of Ser. No. 982,383, Nov. 25, 1992, abandoned, which is a continuation-in-part of Ser. No. 929,898, Aug. 11, 1992, abandoned.

[51] Int. Cl.⁶ ............................. B32B 9/00; B32B 19/00; B32B 27/20; C08K 3/00
[52] U.S. Cl. ........................ 428/34.5; 428/36.5; 428/220; 428/294; 428/317.9; 428/339; 428/532; 524/4; 524/425; 524/447; 524/498; 524/650
[58] Field of Search .................................. 428/34.5, 35.6, 428/35.7, 36.4, 36.5, 220, 294, 312.4, 312.6, 313.9, 317.9, 339, 532; 524/4, 425, 446, 447, 451, 498, 650

[56] References Cited

U.S. PATENT DOCUMENTS

| | | |
|---|---|---|
| 882,538 | 3/1908 | Sargent . |
| 1,234,692 | 7/1917 | Ignacy . |
| 1,427,103 | 8/1922 | Haenicke . |
| 1,954,117 | 4/1934 | Caldwell . |
| 1,965,538 | 7/1934 | Stewart . |
| 2,170,102 | 8/1939 | Thompson . |

(List continued on next page.)

FOREIGN PATENT DOCUMENTS

| | | |
|---|---|---|
| 619559 | 5/1961 | Canada . |
| 627550 | 9/1961 | Canada . |
| 0006390A1 | 1/1980 | European Pat. Off. . |
| 0118240B1 | 9/1984 | European Pat. Off. . |
| 0265745A2 | 5/1988 | European Pat. Off. . |
| 0271853B2 | 6/1988 | European Pat. Off. . |
| 0290007A1 | 11/1988 | European Pat. Off. . |

(List continued on next page.)

OTHER PUBLICATIONS

Weinrich, R., *German Comes Up With Recycled Product to Replace Foam Chips.*
Andersen, *Control and Monitoring of Concrete Production–A Study of Particle Packing and Rheology,* The Danish Academy of Technical Sciences (1990).
Greminger, Jr. and Krumel, *Alkyl and Hydroxyalkylalkylcellulose,* Dow Chemical U.S.A., Midland, Oregon.
Westman and Hugill, *The Packing of Particles,* (1930).
D. Satas, *Coating, Equipment,* in The Wiley Encyclopedia of Packaging Technology 186–191 (Marilyn Bakker ed., 1986).
Young and Berg, *Introduction to MDF Cement Composites,* ACBM vol. 1, No. 2, Fall 1989.
Vrana, *Khashoggi Kin Reported Planning Private Placement of Shares in New Container Firm,* Los Angeles Business Journal, Mar. 28, 1993.
"New methods for concrete may mean technical knock–out for plastic," *The Engineer,* Separate of No. 14/86 (translation).
Johansen, Vagn and Per Just Andersen, "Particle Packing and Concrete Properties," *Materials Science of Concrete II,* pp. 111–147.
Ashby, M. F., "Overview No. 80: On the Engineering Properties of Materials," *Acta Metall,* vol. 3, No. 5, pp. 1273–1293 (1989).
Ashby, Michael F., "Materials selection in engineering design," *Indian Journal of Technology,* vol. 28, Jun.–Aug. 1990, pp. 217–225.
Davidson, Robert L. and Marshall Sittig, *Water–Soluble Resins,* New York: Reinhold Publishing Corp., Chapman & Hall, Ltd., London.
"Zien In The Food Industry," *Freeman Industries, Inc.,* P.O. Box 415, Tuckahoe, NY 10707–0415 USA.
Byggeteknik, Teknologisk Institut, Blad No. 1, *Fiberbetonnyt,* (Oktober 1987). English Translation–Department of Building Technology, The Technologocial Institute of Denmark, Pamphlet No. 1, *Fiber Concrete News* (Oct. 1987).
Per Just Andersen, et al., *Tailoring of Cement–Bound Materials by the Use of Packing and Rheological Models,* American Ceramic Society (1988).

(List continued on next page.)

*Primary Examiner*—Marion E. McCamish
*Assistant Examiner*—Blaine R. Copenheaver
*Attorney, Agent, or Firm*—Workman, Nydegger & Seeley

[57] ABSTRACT

Containers use in the storing, dispensing, packaging, and/or portioning of food and beverage products are disclosed. The disposable and nondisposable food and beverage containers are manufactured from aggregates held together by organic binders in order to be lightweight, insulative, inexpensive, and more environmentally compatible than those currently used for storing, dispensing, packaging, or portioning such products. The food and beverage containers of the present invention are particularly useful for dispensing hot and cold food and beverages in the fast food restaurant environment. The structural matrices of the food and beverage containers include a hydrated organic binder paste (formed by mixing the binder with water) in combination with appropriate aggregate materials, such as fibers to add flexibility and strength, glass spheres to make the product more lightweight and insulative, or clay to make the product extremely inexpensive yet strong. In addition, the structural matrix may include entrained air voids to make the final product even more lightweight and insulative. These combinations allow the manufacture of food and beverage at a cost which is economically justified in comparison to conventional paper, plastic, or styrofoam products.

161 Claims, No Drawings

U.S. PATENT DOCUMENTS

| | | |
|---|---|---|
| 2,205,735 | 6/1940 | Scherer . |
| 2,307,629 | 1/1943 | MacIldowie . |
| 2,432,971 | 12/1947 | Ruthman et al. . |
| 2,549,507 | 4/1951 | Morgan et al. . |
| 2,629,667 | 2/1953 | Kaveler . |
| 2,700,615 | 1/1955 | Heismer . |
| 2,754,207 | 7/1956 | Schur et al. . |
| 2,793,957 | 5/1957 | Mangold et al. . |
| 2,820,713 | 1/1958 | Wagner . |
| 2,837,435 | 6/1958 | Miller et al. . |
| 2,943,013 | 6/1960 | Arledter . |
| 2,959,489 | 11/1960 | Wagner . |
| 2,968,561 | 1/1961 | Bimkrant . |
| 3,006,615 | 10/1961 | Mason, Jr. . |
| 3,007,222 | 11/1961 | Ragan . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,097,929 | 7/1963 | Ragan . |
| 3,117,014 | 1/1964 | Klug . |
| 3,169,877 | 2/1965 | Bartoli et al. . |
| 3,215,549 | 11/1965 | Ericson . |
| 3,253,978 | 5/1966 | Bodendorf et al. . |
| 3,305,613 | 2/1967 | Spence . |
| 3,306,961 | 2/1967 | Spence . |
| 3,356,779 | 12/1967 | Schulze . |
| 3,403,205 | 9/1968 | Ottenholm . |
| 3,432,317 | 3/1969 | Kelly et al. . |
| 3,458,329 | 7/1969 | Owens et al. . |
| 3,470,005 | 9/1969 | Flachsenberg et al. . |
| 3,520,707 | 7/1970 | Steinberg et al. . |
| 3,526,172 | 9/1970 | Stuart . |
| 3,579,366 | 5/1971 | Rehmar . |
| 3,683,760 | 8/1972 | Silva . |
| 3,745,891 | 7/1973 | Bodendoerfer . |
| 3,752,351 | 8/1973 | Nagata ........................... 428/703 |
| 3,754,954 | 8/1973 | Gabriel ........................... 106/97 |
| 3,759,729 | 9/1973 | Fahn . |
| 3,770,859 | 11/1973 | Bevan . |
| 3,806,571 | 4/1974 | Ronnmark et al. . |
| 3,824,107 | 7/1974 | Weiant . |
| 3,855,908 | 12/1974 | Schmidt et al. . |
| 3,857,715 | 12/1974 | Humphrey ........................ 106/92 |
| 3,902,912 | 9/1975 | Wolf ........................... 106/99 |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,952,130 | 4/1976 | Nason . |
| 3,954,490 | 5/1976 | Cockram ........................ 106/99 |
| 3,968,004 | 7/1976 | Coffey et al. . |
| 3,989,534 | 11/1976 | Plungian et al. . |
| 3,998,651 | 12/1976 | Baudouin et al. . |
| 4,002,482 | 1/1977 | Coenen ........................ 106/40 |
| 4,017,321 | 4/1977 | Reighter . |
| 4,017,324 | 4/1977 | Eggers . |
| 4,028,454 | 6/1977 | Davidovits . |
| 4,040,851 | 8/1977 | Ziegler . |
| 4,043,862 | 8/1977 | Roberts . |
| 4,053,346 | 10/1977 | Amberg et al. . |
| 4,070,196 | 1/1978 | Kraak et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,076,846 | 2/1978 | Nakatsuka et al. . |
| 4,077,809 | 3/1978 | Plunguian et al. . |
| 4,080,213 | 3/1978 | Mori et al. . |
| 4,084,980 | 4/1978 | Motoki . |
| 4,085,001 | 4/1978 | Fukuwatari et al. . |
| 4,089,691 | 5/1978 | Cummisford et al. . |
| 4,093,690 | 6/1978 | Murray . |
| 4,117,059 | 9/1978 | Murray . |
| 4,117,060 | 9/1978 | Murray . |
| 4,121,402 | 10/1978 | Cress et al. . |
| 4,124,550 | 11/1978 | Kobayashi et al. . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,158,989 | 6/1979 | Barr . |
| 4,172,154 | 10/1979 | von Rymon Lipinski . |
| 4,185,923 | 1/1980 | Bouette et al. . |
| 4,187,768 | 2/1980 | Suzuki . |
| 4,188,231 | 2/1980 | Valore . |
| 4,196,161 | 4/1980 | Toffolon et al. . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishda et al. . |
| 4,244,781 | 1/1981 | Heckman . |
| 4,248,664 | 2/1981 | Atkinson et al. . |
| 4,249,991 | 2/1981 | Baes et al. . |
| 4,257,710 | 3/1981 | Delcoigne et al. . |
| 4,261,754 | 4/1981 | Krenchel et al. . |
| 4,269,657 | 5/1981 | Gomez et al. . |
| 4,271,228 | 6/1981 | Foster et al. . |
| 4,272,198 | 6/1981 | Velikov et al. . |
| 4,287,247 | 9/1981 | Reil et al. . |
| 4,299,790 | 11/1981 | Greenberg . |
| 4,303,690 | 12/1981 | Haas, Sr. et al. . |
| 4,305,758 | 12/1981 | Powers et al. . |
| 4,306,059 | 12/1981 | Yokobayashi et al. . |
| 4,310,996 | 1/1982 | Mulvey et al. . |
| 4,313,997 | 2/1982 | Ruff et al. . |
| 4,326,891 | 4/1982 | Sadler . |
| 4,328,136 | 5/1982 | Blount . |
| 4,329,177 | 5/1982 | George . |
| 4,353,748 | 10/1982 | Birchall et al. . |
| 4,370,166 | 1/1983 | Powers et al. . |
| 4,373,957 | 2/1983 | Pedersen . |
| 4,373,992 | 2/1983 | Bondoc . |
| 4,378,271 | 3/1983 | Hargreaves et al. . |
| 4,379,198 | 4/1983 | Jaeschke et al. . |
| 4,383,862 | 5/1983 | Dyson . |
| 4,394,930 | 7/1983 | Korpman . |
| 4,406,703 | 9/1983 | Guthrie et al. . |
| 4,410,571 | 10/1983 | Korpman . |
| 4,415,366 | 11/1983 | Copening . |
| 4,427,610 | 1/1984 | Murray . |
| 4,428,741 | 1/1984 | Westphal . |
| 4,428,775 | 1/1984 | Johnson et al. . |
| 4,445,970 | 5/1984 | Post et al. . |
| 4,452,596 | 6/1984 | Clauss et al. . |
| 4,460,348 | 7/1984 | Iioka et al. . |
| 4,462,835 | 7/1984 | Car . |
| 4,470,877 | 9/1984 | Johnstone et al. . |
| 4,487,657 | 12/1984 | Gomez . |
| 4,490,130 | 12/1984 | Konzal et al. . |
| 4,497,662 | 2/1985 | Chisholm et al. ........................ 92/106 |
| 4,508,595 | 4/1985 | Gasland . |
| 4,522,772 | 6/1985 | Bevan . |
| 4,524,828 | 6/1985 | Sabins et al. . |
| 4,529,653 | 7/1985 | Hargreaves et al. . |

| Patent No. | Date | Name | Class |
|---|---|---|---|
| 4,529,662 | 7/1985 | Lancaster et al. . | |
| 4,529,663 | 7/1985 | Lancaster et al. . | |
| 4,533,393 | 8/1985 | Neuschaeffer et al. . | |
| 4,533,581 | 8/1985 | Asaumi et al. . | |
| 4,536,173 | 8/1985 | Puls . | |
| 4,545,854 | 10/1985 | Gomez et al. . | |
| 4,549,930 | 10/1985 | Dessauer . | |
| 4,551,384 | 11/1985 | Aston et al. . | |
| 4,552,463 | 11/1985 | Hodson . | |
| 4,571,233 | 2/1986 | Konzal . | |
| 4,581,003 | 4/1986 | Ito et al. . | |
| 4,585,486 | 4/1986 | Fujita et al. . | |
| 4,588,443 | 5/1986 | Bache . | |
| 4,595,623 | 6/1986 | Du Pont et al. . | |
| 4,613,627 | 9/1986 | Sherman et al. . | |
| 4,619,636 | 10/1986 | Bogren . | |
| 4,621,763 | 11/1986 | Brauner . | |
| 4,622,026 | 11/1986 | Ito et al. . | |
| 4,623,150 | 11/1986 | Moehlman et al. . | |
| 4,636,345 | 1/1987 | Jensen et al. . | |
| 4,637,860 | 1/1987 | Harper et al. . | |
| 4,640,715 | 2/1987 | Heitzmann et al. . | |
| 4,642,137 | 2/1987 | Heitzman et al. . | |
| 4,652,218 | 12/1985 | Fornandel et al. . | |
| 4,655,981 | 4/1987 | Nielsen . | |
| 4,673,438 | 6/1987 | Wittwer et al. . | |
| 4,680,023 | 7/1987 | Varano . | |
| 4,707,187 | 11/1989 | Tsuda et al. . | |
| 4,707,221 | 11/1987 | Beer et al. . | |
| 4,710,422 | 12/1987 | Fredenucci . | |
| 4,711,669 | 12/1987 | Paul et al. . | |
| 4,753,710 | 6/1988 | Langley et al. . | |
| 4,754,589 | 7/1988 | Leth . | |
| 4,755,494 | 7/1988 | Ruben . | |
| 4,775,580 | 10/1988 | Dighton . | |
| 4,784,693 | 11/1988 | Kirkland et al. . | |
| 4,786,670 | 11/1988 | Tracy et al. . | |
| 4,789,913 | 12/1988 | Dunton | 366/12 |
| 4,797,161 | 1/1989 | Kirchmayr et al. . | |
| 4,799,961 | 1/1989 | Friberg . | |
| 4,814,012 | 3/1989 | Paul et al. . | |
| 4,828,650 | 5/1989 | Wagle et al. . | |
| 4,833,191 | 5/1989 | Bushway et al. . | |
| 4,836,940 | 6/1989 | Alexander . | |
| 4,842,649 | 6/1989 | Heitzman et al. . | |
| 4,846,932 | 7/1989 | Karita et al. . | |
| 4,861,649 | 8/1989 | Browne . | |
| 4,863,655 | 9/1989 | Lacourse et al. . | |
| 4,872,913 | 10/1989 | Dunton et al. . | |
| 4,879,173 | 11/1989 | Randall . | |
| 4,889,428 | 12/1989 | Hodson . | |
| 4,889,594 | 12/1989 | Gavelin . | |
| 4,892,589 | 1/1990 | Kirkland et al. . | |
| 4,892,590 | 1/1990 | Gill et al. . | |
| 4,895,598 | 1/1990 | Hedberg et al. . | |
| 4,912,069 | 3/1990 | Ruben . | |
| 4,919,758 | 4/1990 | Wagle et al. . | |
| 4,921,250 | 5/1990 | Ayers . | |
| 4,923,665 | 5/1990 | Andersen et al. . | |
| 4,925,530 | 5/1990 | Sinclair et al. . | |
| 4,927,043 | 5/1990 | Vanderlaan . | |
| 4,927,656 | 5/1990 | Ito . | |
| 4,935,097 | 6/1990 | Tashiro et al. . | |
| 4,939,192 | 7/1990 | t'Sas | 44/524 |
| 4,941,922 | 7/1990 | Snyder . | |
| 4,943,349 | 7/1990 | Gomez . | |
| 4,944,595 | 7/1990 | Hodson . | |
| 4,948,429 | 8/1990 | Arfaei . | |
| 4,952,278 | 8/1990 | Gregory et al. . | |
| 4,957,558 | 9/1990 | Ueda et al. . | |
| 4,957,754 | 9/1990 | Munk et al. . | |
| 4,963,309 | 10/1990 | Gohlisch et al. . | |
| 4,963,603 | 10/1990 | Felegi, Jr. et al. . | |
| 4,976,131 | 12/1990 | Grims et al. . | |
| 4,979,992 | 12/1990 | Bache . | |
| 4,985,119 | 1/1991 | Vinson et al. | 162/149 |
| 4,999,056 | 2/1991 | Rasmussen . | |
| 5,017,268 | 5/1991 | Clitherow et al. . | |
| 5,018,379 | 5/1991 | Shirai et al. . | |
| 5,021,093 | 6/1991 | Beshay | 106/731 |
| 5,030,282 | 7/1991 | Matsuhashi et al. . | |
| 5,035,930 | 7/1991 | Lacourse et al. . | |
| 5,039,003 | 8/1991 | Gordon et al. . | |
| 5,039,378 | 8/1991 | Pommier et al. . | |
| 5,039,560 | 8/1991 | Durgin et al. . | |
| 5,043,196 | 8/1991 | Lacourse et al. . | |
| 5,047,086 | 9/1991 | Hayakawa et al. | 731/106 |
| 5,049,237 | 9/1991 | Bohrn et al. . | |
| 5,061,346 | 10/1991 | Taggart et al. . | |
| 5,071,512 | 12/1991 | Bixler et al. . | |
| 5,076,985 | 12/1991 | Koch et al. . | |
| 5,082,500 | 1/1992 | Nachtman et al. . | |
| 5,085,366 | 2/1992 | Durgin et al. . | |
| 5,089,186 | 2/1992 | Moore et al. . | |
| 5,089,198 | 2/1992 | Leach . | |
| 5,096,650 | 5/1992 | Renna . | |
| 5,102,596 | 4/1992 | Lempfer et al. | 115/264 |
| 5,104,487 | 4/1992 | Taggart et al. . | |
| 5,104,669 | 4/1992 | Wolke et al. . | |
| 5,106,880 | 4/1992 | Miller et al. . | |
| 5,108,677 | 4/1992 | Ayres | 264/112 |
| 5,108,679 | 4/1992 | Rirsche et al. . | |
| 5,110,413 | 5/1992 | Steer . | |
| 5,122,231 | 6/1992 | Anderson . | |
| 5,126,013 | 6/1992 | Wiker et al. . | |
| 5,126,014 | 6/1992 | Chung . | |
| 5,132,155 | 7/1992 | Singh et al. . | |
| 5,134,179 | 7/1992 | Felegi, Jr. et al. . | |
| 5,139,615 | 8/1992 | Conner et al. . | |
| 5,141,797 | 8/1992 | Wheeler . | |
| 5,153,037 | 10/1992 | Altieri . | |
| 5,154,771 | 10/1992 | Wada et al. . | |
| 5,156,718 | 10/1992 | Neubert . | |
| 5,160,368 | 11/1992 | Begovich . | |
| 5,160,676 | 11/1992 | Singh et al. . | |
| 5,167,894 | 12/1992 | Baumgarten . | |
| 5,169,566 | 12/1992 | Stucky et al. . | |
| 5,178,730 | 1/1993 | Bixler et al. . | |
| 5,184,995 | 2/1993 | Kuchenbecker . | |
| 5,185,382 | 2/1993 | Neumann et al. . | |
| 5,186,990 | 2/1993 | Starcevich . | |
| 5,194,206 | 3/1993 | Koch et al. . | |
| 5,206,087 | 4/1993 | Tokiwa et al. . | |
| 5,208,267 | 5/1993 | Neumann et al. . | |
| 5,221,435 | 6/1993 | Smith, Jr. . | |
| 5,224,595 | 7/1993 | Sugimoto et al. . | |
| 5,248,702 | 9/1993 | Neumann et al. . | |
| 5,252,271 | 10/1993 | Jeffs . | |
| 5,256,711 | 10/1993 | Tokiwa et al. . | |
| 5,258,430 | 11/1993 | Bastioli et al. . | |
| 5,262,458 | 11/1993 | Bastioli et al. . | |
| 5,264,030 | 11/1993 | Tanabe et al. . | |
| 5,264,080 | 11/1993 | Shaw et al. . | |
| 5,266,368 | 11/1993 | Miller . | |
| 5,268,187 | 12/1993 | Quinlan . | |
| 5,272,181 | 12/1993 | Boehmer et al. . | |
| 5,273,821 | 12/1993 | Olson et al. . | |
| 5,275,774 | 1/1994 | Bahr et al. . | |
| 5,277,762 | 1/1994 | Felegi, Jr. et al. . | |
| 5,277,764 | 1/1994 | Johansson et al. . | |
| 5,278,194 | 1/1994 | Tickner et al. . | |
| 5,279,658 | 1/1994 | Aung . | |
| 5,284,672 | 2/1994 | Ito . | |
| 5,288,318 | 2/1994 | Mayer et al. . | |

| | | |
|---|---|---|
| 5,288,765 | 2/1994 | Bastioli et al. . |
| 5,290,350 | 3/1994 | Besnard et al. . |
| 5,294,299 | 3/1994 | Zeunner et al. . |
| 5,298,273 | 3/1994 | Ito . |
| 5,300,333 | 4/1994 | Wilkerson et al. . |
| 5,308,879 | 5/1994 | Akamatu et al. . |
| 5,314,754 | 5/1994 | Knight . |
| 5,316,624 | 5/1994 | Racine . |
| 5,317,037 | 5/1994 | Golden et al. . |
| 5,317,119 | 5/1994 | Ayres . |
| 5,320,669 | 6/1994 | Lim et al. . |
| 5,338,349 | 8/1994 | Farrar . |
| 5,340,558 | 8/1994 | Friedman et al. . |
| 5,345,424 | 9/1994 | Rha et al. . |
| 5,346,541 | 9/1994 | Goldman et al. . |
| 5,360,586 | 11/1994 | Wyatt et al. . |
| 5,362,776 | 11/1994 | Barenberg et al. . |
| 5,362,777 | 11/1994 | Tomka . |
| 5,372,877 | 12/1994 | Kannankeril . |
| 5,411,639 | 5/1995 | Kurrie . |

FOREIGN PATENT DOCUMENTS

| | | |
|---|---|---|
| 304401B1 | 2/1989 | European Pat. Off. . |
| 0340765 | 3/1989 | European Pat. Off. . |
| 89107882.6 | 4/1989 | European Pat. Off. . |
| 0340707A2 | 11/1989 | European Pat. Off. . |
| 0370913B1 | 5/1990 | European Pat. Off. . |
| 0405146B1 | 1/1991 | European Pat. Off. . |
| 453980A2 | 10/1991 | European Pat. Off. . |
| 0546956A2 | 6/1993 | European Pat. Off. . |
| 551954A2 | 7/1993 | European Pat. Off. . |
| 1278195 | 2/1981 | France . |
| 2642731 | 8/1990 | France . |
| 3011330 | 3/1980 | Germany . |
| 2841172 | 4/1980 | Germany . |
| 4-70304 | of 0000 | Japan . |
| 2-190304 | of 0000 | Japan . |
| 47-20190 | 9/1972 | Japan . |
| 51-2729 | 1/1976 | Japan . |
| 53-16730 | 2/1978 | Japan . |
| 54-31320 | 3/1979 | Japan . |
| 54-48821 | 3/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 60-264375 | 12/1985 | Japan . |
| 60-260484 | 12/1985 | Japan . |
| 62-46941 | 2/1987 | Japan . |
| 62-39204 | 2/1987 | Japan . |
| 62-151304 | 7/1987 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 3-80141 | 4/1991 | Japan . |
| 3-153551 | 7/1991 | Japan . |
| 3-187962 | 8/1991 | Japan . |
| 3-208847 | 9/1991 | Japan . |
| 3-202313 | 9/1991 | Japan . |
| 3-202310 | 9/1991 | Japan . |
| 5-320401 | 12/1993 | Japan . |
| 6-32386 | 2/1994 | Japan . |
| 9100590 | 11/1992 | Netherlands . |
| 2050459 | 1/1981 | United Kingdom . |
| 1584387 | 2/1981 | United Kingdom . |
| 2192392 | 1/1988 | United Kingdom . |
| 2220934 | 1/1990 | United Kingdom . |
| 2265916 | 10/1993 | United Kingdom . |
| WO87/00828 | 2/1987 | WIPO . |
| WO89/02225 | 3/1989 | WIPO . |
| WO91/12186 | 8/1991 | WIPO . |
| WO94/18388 | 8/1994 | WIPO . |
| WO94/18384 | 8/1994 | WIPO . |

OTHER PUBLICATIONS

Andersen, Per Just, "Tailoring of Concrete Materials," *R&H Annual Review*, 1988.

Strabo, Finn, Clauson–Kaas, N. F., Anderson, Per Just, and Thaulow, Niels, "Extrusion of Fiber Concrete," Department of Building Technology, The Technological Institute of Denmark, Oct. 1987.

Strabo, Finn, Clauson–Kaas, Niels, Andersen, Ole Viggo, "New Design Methods for Fiber Concrete," Department of Building Technology, Technological Institute of Denmark, Apr. 1987.

Finn, Strabo et al. "Ekstrudering AF Fiberbeton" Byggeteknik Teknologisk Institut. TR–projeckt nr. 19850133/177–85538. English Translation–Strabo, Finn, et al. "Extrusion of Fiber Concrete," Danish Technological Institute, Department of Building Technology, Oct. 1987.

Finn, Strabo et al. "Nye Formgivningsmetoder Til Fiberbeton" Byggeteknik, Teknologisk Institut. English Translation–Strabo, Finn, et al., New Design Methods for Fiber Concrete. Technological Institute of Denmark, Department of Building Technology, Apr. 1987.

"Nye Metoder I Beton Kan Betyde Teknisk Knock–Out for Plast" Ingenioren, Saertryk fra nr. 14/86. English Translation–New Method for concrete may mean technical knock-out for plastic. *The Engineer*, No. 14, 1986.

Zukowski and Struble, *Rheology of Cementitious Systems*, MRS Bulletin, Mar. 1993.

Lewis and Kriven, *Microstructure–Property Relationships in Macro–Defect–Free Cement*, MRS Bulletin, Mar. 1993.

Young and Berg, *Introduction to MDF Cement Composites*, ACBM vol. 1, No. 2, Fall 1989. pp. (1 to 5 & 8).

Balaguru and Kendzulak, *Flexural Behavior of Slurry Infiltrated Fiber Concrete (SIFCON) Made Using Condensed Silica Fume.*

Naaman and Homrich, *Tensile Stress–Strain Properties of SIFCON*, ACI Materials Journal, May–Jun. 1989.

Stix, *Concrete Solutions*, Scientific American, Apr. 1993.

Strabo, *Cementbuserede Hybridkomposittes*, Byggeteknik Teknologisk Institut, 1987. English Translation–Strabo, Andersen, and Clauson–Kaas, *Cement–Based Hybrid Composites*, 1987.

Strabo et al, *Fiberbeton Teknology.*, Byggeteknik Teknologisk Institut, 1986. English Translation–Strabo, Cluason-Kaas, Chatterji, and Thaulow, *Fiber Concrete Technology TR–Project*, 1986.

Andersen, et al., *Tailoring of Cement–Bound Materials By the Use of Packing and Rheological Models*, American Ceramic Society (1988).

*Plastic–Forming Processes.*Knab, Clifton, and Ings, *Effects of Maximum Void Size and Aggregate Characteristics on the Strength of Mortar*, Cement and Concrete Research. vol. 13 pp. 383–390, 1983.

Unwalla and Green, editors, *Recycled Materials for Making Concrete*, The Indian Concrete Journal, vol. 53, No. 9, Sep. 1979.

Rosenberg and Gaidis, *A New Mineral Admixture for High-Strength Concrete–Proposed Mechanism for Strength Enhancement*, Second International Conference on the Use of Fly Ash, Silica Fume, Slag and Natural Pozzolans in Concrete, Apr. 21–25, 1986.

Brown, Ledbetter, and Jennings, *An Investigation of a High Speed Shear Mixer on Selected Pastes and Mortars*, Mat. Res. Soc. Symp. Proc vol. 137, 1989.

*The Colcrete Process*, Undated Publication.

*The Coating Process for Paper*, 1993.

Lawrence, *The Properties of Cement Paste Compacted Under High Pressure: Research Report 19*, Cement and Concrete Association Research Report 19, Jun. 1969.

Jones and Berard, *Raw Materials Processing*, Ceramics: Industrial Processing and Testing, Iowa State University Press, 1972.

Hlavac, *The Technology of Glass and Ceramics*, Glass Science and Technology, 4: The Technology of Glass and Ceramics, Elsevier Publishing, 1983.

Skalny and Bajza, *Properties of Cement Pastes Prepared by High Pressure Compaction*, ACI Journal, Mar. 1970.

Bach, *Cement–Based Products Processed the Plastics Way*.

Lecznar and Barnoff, *Strength of Neat Cement Pastes Molded Under Pressure*, Journal of the American Concrete Institute Concrete Briefs, Feb. 1961.

Roy, gouda, and Bobrowsky, *Very High Strength Cement Pastes Prepared by Hot Pressing and Other High Pressure Techniques*, Cement and Concrete Research, vol. 2, pp. 349–366, 1972.

B. W. Attwood, *Paperboard, The Wiley Encyclopedia of Packaging Technology* 500–506 (Marilyn Bakker ed., 1986).

G. A. Baum, et al., *Paper, Kirk–Othmer Concise Encyclopedia of Chemical Technology* 834–836 (Martin Grayson ed., 1985).

George S. Brady & Henry R. Clauser, *Materials Handbook* 588–594 (1991).

James E. Kline, *Paper and Paperboard Manufacturing and Converting Fundamentals* 19–28 (2d ed. 1982).

Richard J. Lewis, Sr., *Condensed Chemical Dictionary* 870 (12th ed. 1993).

Stearns T. Putnam, et al., *Papermaking Additives, Kirk–Othmer Concise Encyclopedia of Chemical Technology* 836–837 (Martin Grayson ed., 1985).

M. Sikora, *Paper, The Wiley Encyclopedia of Packaging Technology* 497–500 (Marilyn Bakker ed., 1986).

Vrana, *Khashoggi Kin Reported Planning Private Placement of Shares in New Container Firm*.

Roy, et al., *Processing of Optimized Cements and concretes via Particle Packing*, Mrs. Bulletin (Mar. 1993).

Samuel Ferretti, MRS *Distributed Reinforcement Concrete Pipes: An Innocative Product* 44–48 (May 1993).

Dow Plastics, *Thermoforming Process Guide*.

Bajza, *On The Factors Influencing the Strength of Cement Compacts*, Cement and Concrete Research, vol. 2, pp. 67–78, 1972.

FOOD AND BEVERAGE CONTAINERS MADE FROM INORGANIC AGGREGATES AND POLYSACCHARIDE, PROTEIN, OR SYNTHETIC ORGANIC BINDERS, AND THE METHODS OF MANUFACTURING SUCH CONTAINERS

This application is a continuation of U.S. application Ser. No. 07/982,383, filed Nov. 25, 1992, which is a continuation-in-part of U.S. Ser. No. 07/929,898, filed Aug. 11, 1992, both now abandoned.

BACKGROUND

1. The Field of the Invention

The present invention relates to containers for use in the storing, dispensing, and packaging of food and beverage products. More particularly, the present invention is directed to both disposable and nondisposable food and beverage containers manufactured from inorganic aggregates and organic binders, which containers are lightweight, insulative, inexpensive, and/or more environmentally neutral than those currently used in the storing, dispensing (e.g., serving or portioning), and packaging food and beverage products. Disposable containers of the present invention are particularly useful for dispensing hot and cold food and beverages in the fast food restaurant environment.

2. Related Application

This patent application is a continuation-in-part of pending patent application Ser. No. 07/929,898, filed Aug. 11, 1992, for CEMENTITIOUS FOOD AND BEVERAGE STORAGE, DISPENSING, AND PACKAGING CONTAINERS AND THE METHODS OF MANUFACTURING SAME in the names of Per Just Andersen, Ph.D. and Simon K. Hodson (now abandoned).

3. Review of the Relevant Technology

The United States enjoys one of the safest food supplies in the world. Advanced processing and packaging techniques allow foods to travel safely for long distances from their point of origin. Even with lengthy and time consuming distribution systems, today's food products arrive more wholesome than foods in other places in the world where there are fewer and inferior processing and packaging options.

Packaging protects food from environmental influences and damage during distribution. It also provides a medium for the dissemination of information to the consumer like, for example, nutritional information, cooking instructions, ingredients, product weight, advertising, brand identification, and pricing.

Specifically, packaging protects foods from two major destructive influences: chemical and physical. Chemical protection is related to compositional changes resulting from exposure to gases (typically oxygen), moisture (either gain or loss of moisture can be damaging), light, or microorganisms. Although not strictly a chemical problem, packaging also provides a barrier against vermin, including rodents and insects.

On the other hand, protecting against physical destruction includes restricting the physical contents of the goods, cushioning against shock and vibration encountered during distribution, and preventing the items from leaking or being crushed. Many foods are transported in bulk and then prepared on site and dispensed to the end user by means of a disposable container, such as a cup, plate, or box (such as the "clam shell" frequently used in fast food restaurants). Traditionally, such disposable cups and other containers have been made from paper or plastic, e.g., styrofoam or other polystyrene-type materials. Every year, 5.6 billion tons of plastic packaging containers are produced.

Because hot items (such as drinks and fast food) require a container that is insulated to slow the flow of heat (both to keep the item hot and to protect the consumer from being burned or scalded) the container of choice in recent years has typically been made from styrofoam. Although paper or plastic coated containment products can be equipped with special handles, styrofoam containers have remained the far superior disposable container of choice when insulation is required, because of insulation capabilities, cost, and stability.

Recently, with the public's attention being more focused on environmental issues, certain containment products have come under heavy scrutiny, especially disposable cups and boxes. Most notably subject to criticism have been styrofoam products, which typically require the use of chlorofluorocarbons (or "CFC's") in their manufacture, as well as use of vast amounts of the ever shrinking petroleum reserves.

CFC's are relatively stable and inert and are widely used in a variety of important industrial and domestic activities, including refrigeration and the manufacture of styrofoam packing materials and containers. Both of these uses have been important in the storage and distribution of foods.

However, CFC's have been linked to the destruction of the ozone layer because they release chlorine products into the stratosphere. It is thought that the CFC molecule, which is very stable, eventually migrates upward through the atmosphere into the stratosphere. There it is bombarded by the sun's ultraviolet ("UV") radiation, which breaks the CFC molecule into its constituent atoms, including chlorine. The freed chlorine atoms form chlorine monoxide, which reacts with ozone ($O_3$), a highly reactive form of oxygen, which is also produced by the photochemical action of the sun. Thus, the formation of ozone and the formation of ozone-depleting chlorine monoxide are competing reactions which are both catalyzed by UV radiation.

Studies conducted by the second North American National Ozone Expedition and the International Airborne Antarctic Ozone Experiment have linked high chlorine monoxide levels with a correspondingly high depletion of the ozone layer. The Ozone Trends Panel concluded that from 1969 to 1986, ozone levels had dropped from between about 1.7% to 3% in the latitude band 30° to 64° N, which covers most of the United States, Europe, the former Soviet Union, and China. Winter-time depletion in the northern portion of this region was even more severe, being from 5% to 6%.

The ozone layer is responsible for filtering the most harmful UV wavelengths emitted by the sun, and its depletion will undoubtedly lead to widespread damage to living organisms. Excessive exposure to UV radiation causes burning to the skin and retinas of humans and animals. One recent "ozone hole" reported over the southern tip of South America reportedly caused blindness, cataracts, and other UV radiation induced illnesses in cattle and sheep in Tierra del Fuego, the southernmost region of Chile and Argentina.

More generally, medical authorities have reported a 30% rise in skin cancer cases in the U.S. in the last decade, most of them due to sun exposure. There have been numerous studies and reports that have concluded that further breakdown of the ozone layer will lead to sharp increases in skin cancer and cataracts in humans.

While CFC's are utilized in a broad number of applications, according to a report prepared by the Environment Protection Agency ("EPA"), the making of foams such as those used in making some insulation materials accounted for roughly 25% of the total global use of CFC's in 1986. For this and other reasons, efforts have been directed to eliminate the use of CFC's. Several recent treaties, including the 1987 Montreal Protocol, have begun to mandate substantial cuts in the use of CFC's.

In the interim, manufacturers of some types of insulative foam have been turning to HCFC-22. While less ozone-depleting than CFC-12, HCFC-22 is still implicated. As a result, in the early 1990's, some companies have started to use pentane in the foaming process of plastics. Nevertheless, pentane is also very hazardous to the environment and is a greenhouse gas. Breathing pentane vapor can be hazardous.

Styrofoam containers have been widely used in the fast-food industry, for example, to hold coffee and other hot drinks, hamburgers, sandwiches, sushi, salads, fruit dishes, chinese food, pizza, ice cream and similar frozen food products, and almost any other dispensed fast food item imaginable. In particular, the "clam-shell" food container has been, and continues to be, the container of choice for many fast food vendors.

According to the Citizen's Clearinghouse for Hazardous Waste in Arlington, Va., the McDonald's fast-food chain alone, until recently, used 1.5 billion cubic feet of styrofoam each year for its food and drink containers. However, in response to environmental concerns, McDonald's has eliminated styrofoam from most of its containers in favor of traditional paper food wrappers and cups. Other large users of styrofoam containers and cups are considering similar reductions or eliminations of the use of such products.

In fact, there has been widespread clamor for companies to return to using more environmentally safe and low cost containers. Nevertheless, it is thought by some that the use of paper only represents the lesser of the two evils. Although paper products have not been linked to the destruction of the ozone layer, recent studies have shown that in other respects paper more strongly impacts the environment than does styrofoam. In fact, the wood pulp and paper industry is one of the top five polluters in the United States.

A 1991 study by Martin B. Hocking, a professor of chemistry at the University of Victoria, British Columbia compared the environmental impacts of paper versus polystyrene cups, from resource utilization, through manufacturing stages, to final disposal. He concluded that for single-use application, it appears that polystyrene foam cups are not necessarily more damaging to the environment than paper cups. Hocking's analysis indicated, for example, that since acquisition of the raw materials for production of paper cups included both the wood acquisition and a hydrocarbon acquisition equal to that required for polystyrene cups, production of paper cups results in a greater environmental impact.

Additionally, his study showed that six times as much wood pulp by weight as polystyrene is required to produce a cup; the paper cup consumes about 12 times as much steam, 36 times as much electricity, and twice as much cooling water in its manufacturing process than does a polystyrene foam cup. Even more significantly, about 580 times the volume of waste water is produced for the pulp required to make the paper cup.

The effluent from paper making contains 10 to 100 times the amount of contaminants produced in the manufacture of polystyrene foam. For each ton of bleached pulp, 22.7 kilograms of air pollutants are generated, compared with 53 kilograms for each ton of polystyrene. However, because it takes about six times more wood pulp to produce a cup than polystyrene, cup-for-cup polystyrene generates less air pollution.

In addition, the bleaching of wood pulp to form the paper that is incorporated into cups and other packaging containers results in the production of another extremely harmful and notorious by-product: i.e., dioxin. Dioxin, or more accurately, 2,3,7,8-tetrachlorodibenzo[b,e] [1,4]dioxin ("TCDD"), is a highly toxic and teragenic contaminant. According to the Merck Index, dioxin is extremely potent, being extremely dangerous in very low quantities.

Dioxin has been found in discharge waters from paper mills in concentrations of up to 0.5 parts per trillion. However, fish found downstream from paper pulp mills can contain nearly 200 parts per trillion of dioxin, with levels of 50 parts per trillion being not uncommon. Therefore, it appears that dioxin tends to concentrate itself in living tissue and is not metabolized or washed out of the body through dialysis.

Toxic effects of dioxin in animals include anorexia, severe weight loss, hepatotoxicity, hematoporphyria, vascular lesions, chloracne, gastric ulcers, teratogenicity, and premature death. Industrial workers exposed to TCDD have frequently developed chloracne, porphyrinuria, and porphyria cutanea tarda. Most experts in the field believe that dioxin is a carcinogen.

Recently, there has been considerable publicity directed at bleached paper cardboard food containers, which often contain trace amounts of dioxin that can contaminate the food they contain. Typical concentrations of dioxin in bleached paper products range from undetectable amounts up to about 10 parts per trillion.

As of 1989, milk packed in cardboard containers in the United States contained dioxin levels of several hundredths to nearly one part per trillion. Therefore, although milk containers are coated with a waterproofing material, this material is not impermeable and does not prevent the leaching of dioxin. It is estimated that the current daily intake of dioxin in the United States averages about $20 \times 10^{-12}$ grams per kilogram of body weight. The FDA estimates that for every one million average milk drinkers in the United States, five will get cancer as a result of dioxin in milk containers.

Further, it is forgotten that it is often necessary to coat any paper container with a wax or plastic material in order to give it the desired waterproofing properties. Moreover, if insulative properties are necessary, even more drastic modifications to the paper material in the container are necessary.

As mentioned above, many types of plastic containers, as well as the coatings utilized with paper containers, are derived from fossil fuels, mainly petroleum, and share many of the environmental concerns of petroleum refinement and the petrochemical industry, which need not be repeated here.

In addition to the obvious chemical hazards of paper, plastic, and polystyrene production, an additional problem is the impact of these containers on municipal waste disposal systems throughout the country. Both polystyrene and plastics used in food containers are very slow to break down. This is especially true when buried deep inside of landfills, and away from the corrosive effects of light, air, and water.

Similarly, although paper is touted as biodegradable, this is hardly true for paper that is buried deep inside of municipal landfills away from light, moisture, and air. Paper can last a remarkably long time in a municipal dump, there being reports of telephone books being lifted from garbage that had been buried for decades. This longevity of paper is further complicated since it is commonly treated, coated, or impregnated with various organic materials.

Studies have shown that a typical garbage dump includes 41% paper and 7% plastic by weight. Food packaging of all materials accounts for about 12% of the total amount of municipal waste. These figures clearly indicate the significance of current packaging containers. Incineration could reduce these amounts, but incineration is often the source of significant airborne pollution, especially when plastics and polystyrene products are incinerated. Even paper, which burns relatively cleanly, emits dioxin as well as $CO_2$ (which has been implicated as a greenhouse gas).

About the only effective way to reduce the sheer volume of packaging wastes would be to use more reusable containers or recycle disposable ones. However, recycling is not without its contribution of large amounts of pollution into the environment in the form of fuel spent in transporting recyclables to recycling centers, as well as fuels and chemicals used in the recycling process itself.

In short, what are needed are other food and beverage containers for storing, dispensing, and packaging which do not require the wholesale cutting of trees in order to supply the necessary raw materials. In addition, it would be a significant advancement in the art to provide food and beverage containers which are more environmentally neutral, such as minimizing the use of ozone-depleting chemicals, creation of unsightly garbage that does not, or is very slow to, degrade. It would be yet another improvement to provide food and beverage containers which do not contain hazardous chemicals like dioxin.

It would be a significant advancement to provide insulated food and beverage containers which have the insulating properties of styrofoam, but which do not contribute to the depletion of the ozone layer. Further, it would be significant if such food and beverage containers were lightweight, yet possessed sufficient structural support to hold or contain the food or beverage product in question.

From a practical point of view, such containers must necessarily be capable of being produced inexpensively at costs comparable to existing products. From a manufacturing perspective, it would be a significant advancement in the art to provide food and beverage containers which can be rapidly formed while maintaining their shape without external support so that the final molded product can be handled under ordinary manufacturing conditions.

Finally, it would be a completely novel and important advancement if such food and beverage containers were readily disposable like the disposable cups and containers currently used, but which had essentially the chemical composition of the earth in which they eventually will be disposed.

Such food and beverage containers are disclosed and claimed herein.

BRIEF SUMMARY AND OBJECTS OF THE INVENTION

The present invention relates to the manufacture of food and beverage containers made from a variety of inorganic aggregate materials and organic binders. The organic binders include a variety of polysaccharides and their derivatives, proteins and their derivatives, and synthetic materials. The food and beverage containers according to the present invention are far more environmentally sound than those presently used in the fast food industry.

It has been found that lightweight, insulative, and environmentally benign food and beverage containers can be readily and inexpensively manufactured from aggregate materials held together by organic binders through innovative processes developed through a microstructural engineering approach. Disposable food and beverage containers within the scope of the present invention are particularly useful for dispensing hot and cold food and beverages in the fast food restaurant environment.

In co-pending patent application Ser. No. 07/929,898 (now abandoned), which is specifically incorporated herein for purposes of disclosure, similar food and beverage containers are disclosed wherein the binder primarily comprises a hydraulic cement such as Portland cement.

During the experimentation that led to the discovery of the cementitious food and beverage containers described in application Ser. No. 07/929,898 (now abandoned), it was found that certain plasticizing and stabilizing agents such as alkylcellulose derivatives, vegetable starches, sea starches, and agar provided adequate binding in certain compositional mixtures where hydraulic cement was either purposely or inadvertently left out, in addition to creating plasticity and workability. Thus, it was found that the substituted cellulose based plasticizer TYLOSE® (methylhydroxyethylcellulose) provided sufficient binding strength to hold together a mixture of inorganic aggregates and various types of fibers, which were added to provide flexural strength.

Other suitable polysaccharide binders include other cellulose or substituted cellulose products which provide similar binding properties as TYLOSE®. An example is carboxymethylcellulose. These alkylcellulose products (including TYLOSE®) are similar in structure to, and are derived from, natural cellulose products, but are classified as semi-synthetic products, or modified natural products.

In addition to polysaccharide binders, certain proteins extracted from plants or animals have been found to work well. Examples include Zein®, a prolamine derived from corn, collagen derivatives extracted from animal connective tissue, such as gelatin and glue, and casein, the principal protein in cow's milk.

Suitable synthetic binders include polyvinyl pyrrolidone (hereinafter "PVP"), polyvinyl alcohol, polyvinylmethyl ether, polyacrylic acids, polyacrylic acid salts, polyvinylacrylic acids, polyvinylacrylic acid salts, polyacrylimides, and ethylene oxide polymers.

Similarly, it has been found that a variety of vegetable starch products also provide adequate binding of inorganic aggregates. Such starch products include amylopectin, amylose, and sea-gel. In addition to the natural starch products, modified starch products such as starch acetates, starch hydroxyethyl ethers, ionic starches, long-chain alkyl starches, dextrins, amine starches, phosphate starches, and dialdehyde starches have utility in the present invention.

Other natural polysaccharide derivatives obtained from land and sea life include alginic acid, phycocolloids, agar, gum arabic, guar gum, locust bean gum, gum karaya, and gum tragacanth.

All of these natural products, their derivatives, and the synthetics have properties similar to TYLOSE® and can be used in place of TYLOSE® in the present invention depending on the application.

It should be understood that cellulose-based products and starch-based products are closely related as far as their chemical composition and structure are concerned. Both are polysaccharides consisting of long chains of D-glucose, the primary difference being the orientation of the bonds linking the individual glucose molecules together. Both can be cheaply and efficiently extracted from most plant matter, including both terrestrial and sea plants. Both are highly polar substances containing large amounts of oxygen, primarily in the form of hydroxyl groups. Therefore, they can be made water soluble or water insoluble depending upon where and what groups are substituted thereon.

Finally, all of the organic binders disclosed within the present invention are generally activated by the addition of water, forming a hydrated mixture of binder and aggregate. In addition, other materials, such as air entraining agents and stabilizers may be added to change the properties of the final product.

Because some of the organic binders are more easily solubilized in water than others, it is possible to create disposable food and beverage containers that will disintegrate upon being exposed to water over a period of time, although they may not dissolve so quickly as to lack utility as food and beverage containers. The food and beverage containers of the present invention can be engineered and manufactured with varying speeds of degradation based on the type of binder and the amount of binder that is added to the hydrated mixture. The more binder, the longer it will take for the product to degrade when exposed to water. Conversely, the more water soluble the binder, the faster the container made therefrom will tend to degrade upon being exposed to moisture.

Regardless of the amount of binder that is added, once it dissolves, or otherwise ceases to be effective as a binder, the food and beverage container essentially disintegrates into environmentally innocuous aggregates, for example, inorganic materials such as sand, perlite, vermiculite, or pumice. Other aggregates, such as hollow glass spheres are equally benign, being made of silica, the main ingredient of ordinary beach sand. In addition, fibers such as abaca, which only comprise a small fraction of the overall mass of the food or beverage container, are biodegradable.

Besides these environmentally compatible polysaccharide based, protein based, or synthetic binders, the food and beverage containers made according to the present invention normally contain one or more inorganic aggregate materials such as perlite, vermiculite, hollow glass spheres, clay, synthetic clay, aerogels, pumice, exfoliated rock, concrete, and lightweight concrete. In fact, any aggregate material having similar properties to any of these will also work, the primary concern being the type of food and beverage container desired. Concerns for strength or insulation ability play a large role in selecting the appropriate aggregate.

Where insulation is the primary concern, aggregates such as hollow glass spheres, aerogels, exfoliated rock, pumice lightweight concrete, perlite, vermiculite, expanded clay, expanded fly ash, expanded slag, cork, and any other lightweight and environmentally benign aggregate work well. They are generally characterized as having large amounts of interstitial air which can provide them with a high insulating ability depending how they are incorporated into the structural matrix of the food and beverage container being manufactured.

Where strength and durability is the primary concern, aggregates such as clay, concrete, sand, gravel, limestone, sandstone, calcium carbonate, gypsum (including calcium sulfate, the hemihydrate and the dihydrate), calcium sulfate hydrate, alumina, and any other relatively durable aggregate works well. It should be understood that while clay and gypsum are generally considered to be aggregate materials, especially when included in relatively low quantities, they can impart a degree of binding to the overall mixture when included in high concentrations.

Of particular utility is clay, one of the most environmentally benign substances known to man, having been used for millennia as the raw material for making a multitude of vessels used by man for many different purposes. Equally important is the fact that clay is readily available, a fact that makes clay extremely inexpensive. In addition, because it is essentially "dirt," it is environmentally benign when put back into the earth from whence it came.

Traditionally, a clay vessel did not have much utility unless it was put through a firing process to cause the clay to bind together. Unfired clay quickly disintegrates upon being exposed to water. However, according to the present invention, the use of polysaccharide, protein, and synthetic binders, along with (in some cases) an FDA approved coating material applied to the clay food or beverage container makes the unfired clay container essentially impermeable to water, at least in the short term during the life of the food or beverage container. In addition to its long-term binding effect, binders such as TYLOSE® are able to introduce high green state binding strength, which aids in the manufacturing process.

Because the food and beverage containers of the present invention are especially suited for the fast food industry, which requires food and beverage containers which can be mass-produced at a very low cost, they will generally have a very short life span. Thereafter, water-induced degradation is not only acceptable but desirable, since the discarded food or beverage container will simply turn into environmentally neutral materials. For instance, if the container comprises clay as the aggregate, the dissolved material will simply turn into mud; similar results occur if the container comprises sand, vermiculite, perlite, etc. as the aggregate. Even if more synthetic aggregates are used, such as hollow glass spheres, the degraded product will consist primarily of these spheres, which are mainly comprised of silica and are very similar to ordinary beach sand.

In addition, the other inorganic aggregates are similarly comprised mainly of earth compatible substances; food and beverage containers made with these other aggregates likewise will disintegrate into environmentally innocuous materials. Thus, in the event that such a container is inadvertently discarded into the dirt, it will not persist for very long as unsightly landscape waste (like paper, plastic, or polystyrene), nor will it add an environmentally foreign material (like plastic or polystyrene) to the earth on which it is placed.

In addition to adding lightweight aggregates having large amounts of interstitial voids, air can be entrained into the structural matrix of the food or beverage container which greatly increases the amount of air voids into the product, and which therefore greatly increases the insulating ability of the container. In addition, adding entrained air greatly decreases the overall mass of the container and, hence, the cost of the materials that are required to make the container, as well as the cost to transport the lighter container. Similarly, a food or beverage container which has less mass will eventually take up less space in a landfill into which it is discarded.

Air can be entrained into the raw starting material by adding a surfactant to the hydrated mixture of organic binder and aggregates and mixing the materials in a high speed, high energy mixer discussed more fully below. A suitable surfactant is Mearlcrete, although any air entraining agent that works equally well in creating finely dispersed air voids within the hydrated mixture is within the scope of this invention. The inclusion of TYLOSE® or other suitable binders stabilizes the mixture to aid the retention of the entrained air.

Another way in which small air voids can be incorporated into the mixture is by adjusting the pH to between about 13–14 (by adding any appropriate base) and adding an easily oxidized metal (such as aluminum, zinc, or tin), which results in the concomitant reduction of hydrogen and the formation of tiny hydrogen gas bubbles within the hydrated mixture.

Finally, it is often preferable to reinforce the food or beverage container with fibers, preferably an environmentally benign fiber (such as an organic plant fiber). It has been found that abaca fiber works well, although any similar plant fiber would work equally well. Other fibers include those made from glass, rock wool, carbon, metal, ceramic, and other inorganic materials. The only limiting criteria being (1) that they will not impart dangerous properties to the containers of the present invention, which are intended to come into contact with food or beverages, and (2) that they do not pose any undue environmental risk when disposed of.

In summary, it has been found that a large variety of environmentally benign aggregates can be bound together using equally innocuous polysaccharide binding agents such as cellulose-based materials such as TYLOSE®, vegetable starch based materials such as amylopectin, amylose, or sea-gels, protein based materials such as Zein®, or synthetic binders such as polyvinyl alcohol.

Typical aggregates include perlite, vermiculite, hollow glass spheres, plastic spheres, aerogels, sand, clay, synthetic clay, and organic and inorganic fibers, which can be formed into strong, lightweight materials suitable for making a variety of disposable containers for packaging, storing and dispensing food and beverages, among other things. These materials can be made to be even more insulating by entraining the starting mixtures with air before allowing the products formed therefrom to set or cure.

These products are especially useful in the fast food industry, which is trying to phase out the use of packaging containers which pose the environmental risks and burdens outlined above, namely, paper, plastic, and polystyrene containers. In contrast, food and beverage containers made from inorganic aggregates and organic binders do not require the cutting of any trees to obtain any of the raw materials incorporated therein. Moreover, because these materials can be entrained with air, the absolute mass of material used in each packaging container is usually far less than the material needed to make a similar paper container. Nor does the air entraining process, which can make the material of the present invention as lightweight and insulative as polystyrene, require the use of CFC's or any hydrocarbon gas.

The preferred methods of manufacturing containers for storing, dispensing, or packaging of food or beverage products within the scope of the present invention include the steps of (1) mixing an appropriate binder such as a cellulose based or starch based product to water to form a hydrated binder; (2) adding a fibrous material (such as glass, plastic, metal, abaca, or other natural fibers), preferably with a high aspect ratio, to the hydrated mixture; (3) adding an aggregate or other material to the hydrated binder in order to impart the desired lightweight and/or strength and/or bulk properties to the mixture; (4) molding the mixture into the predetermined shape of a container; and (5) allowing the mixture to harden or cure in the predetermined shape.

In addition, other embodiments of the present invention include the addition of entrained air voids in order to decrease the mass and increase the insulative properties (for both hot and cold foods and beverages) of the food or beverage container. These air voids are created by the incorporation of gas through various techniques into the hydrated mixture during the mixing process, including those discussed herein.

The compositions of the present invention can be varied to yield products of substantially different character. For example, very lightweight products (similar to that of styrofoam) with rigid walls can be manufactured. For convenience, this type of product is sometimes herein referred to as a "foam-type" product.

Alternatively, products that have an appearance more like that of a pottery or ceramic product can be made according to the present invention, although they are typically much lighter than pottery or ceramic, typically having a bulk specific gravity of less than 1.0, whereas pottery or ceramic products typically have a bulk specific gravity of 2.0 or greater. This type of product is sometimes herein referred to as a "clay-type" product. In addition, a hybrid "foam-clay" product can be made which shares characteristics of both "foam-type" and "clay-type" products.

One key feature of the present invention is that the microstructural engineering design of the present invention results in the cost optimization of each of the component materials.

The molding process can be done by a variety of well-known methods which have historically been applied to plastic materials, including roller casting, jiggering, high pressure extrusion, ram pressing, hot isostatic pressing, injection molding, and other casting and forming methods. While these methods are known in the art in connection with plastics and some ceramic and metal powdered materials, it is only because of the unique microstructural engineering of the present invention that the hydrated mixture can be molded into a product such as a food and beverage container and maintain its shape without external support during the green state until curing can occur.

Indeed, the economic viability of manufacturing food and beverage containers according to the present invention is only possible because the hydrated mixture is self-supporting during the green state and will maintain its molded shape throughout the curing process. In addition, the compositions of the present invention importantly provide a hydrated mixture that rapidly reaches a sufficiently high strength so that the molded container can be handled and manipulated using ordinary manufacturing techniques.

From the foregoing, it will be appreciated that an object of the present invention is the development of containers for storing, dispensing, and packaging food and beverages which do not require the use of environmentally damaging methods or resources in order to supply the necessary raw materials.

Further, another object and feature of the present invention is the development of food and beverage containers which are more environmentally neutral, which do not require environmentally harmful chemicals as part of their manufacture, and which do not create unsightly garbage which does not degrade, or only does so very slowly.

Yet another object and feature of the present invention is the development of food and beverage containers which do not contain hazardous chemicals like dioxin or unpolymerized styrene.

A still further object and feature of the present invention is the development of food and beverage containers which have the insulating properties of materials such as styrofoam (without the disadvantages thereof) which maintain the food and beverages therein at an appropriate temperature.

Another object and feature of the present invention is the development of food and beverage containers which are lightweight and yet have a high strength to bulk density ratio to give sufficient structural support for the food or beverage product.

Still another object and feature of the present invention is the development of inexpensive food and beverage containers which can be produced at costs comparable to existing products.

Another object and feature of the present invention is the development of materials containing polysaccharide based, protein based, or synthetic binders which also introduce plasticity into the material so that it can be molded into any predetermined shape, but then retain its shape due to the green body strength that the binders introduce into the material.

A still further object and feature of the present invention is the development of food and beverage containers which will maintain their shape without external support during the green state and rapidly achieve sufficient strength so that the molded container can be handled using ordinary manufacturing techniques.

Finally, an object and feature of the present invention is the development of food and beverage containers which are readily disposable like those currently used, but which have essentially the chemical composition of the earth in which they eventually will be disposed.

These and other objects and features of the present invention will become more fully apparent from the following description and appended claims, or may be learned by the practice of the invention.

DETAILED DESCRIPTION OF THE PREFERRED EMBODIMENTS

The present invention relates to containers for use in the storing, dispensing, and packaging of various food and beverage products. More particularly, the present invention is directed to disposable and nondisposable containers manufactured from aggregate materials that are held together by organic binders. Moreover, such food and beverage containers are lightweight with a high strength to bulk density ratio, are highly insulative, are produced cost effectively, and are more environmentally neutral than materials currently used for storing, dispensing, and packaging.

As discussed above, the food and beverage containers within the scope of the present invention can be made to have a variety of densities and physical characteristics. "Foam-type," "clay-type," or "foam-clay" products can be manufactured depending upon the concentrations and types of the materials used and the molding, casting, or extrusion process utilized.

I. General Discussion.

A. Microstructural Engineering Design.

The food and beverage containers according to the present invention have been developed from the perspective of microstructural engineering in order to build into the composition certain desired properties, while at the same time remaining cognizant of costs and manufacturing complications. This microstructural engineering analysis approach, instead of the traditional trial-and-error mix and test approach, has resulted in the ability to design the food and beverage containers of the present invention with the appropriate properties of strength, weight, insulation, cost, and environmental compatibility.

In general, the number of materials available to engineer a specific product is enormous—estimates range between 50,000 and 80,000. They can be drawn from such disparately broad classes as metals, polymers, elastomers, ceramics, glasses, composites, and cements. Within a given class, there is some commonality in properties, processing, and use patterns. Ceramics, for instance, have high modula, while polymers have low modula; metals can be shaped by casting and forging, while composites require lay-up or special molding techniques; cements have high flexural strength, while elastomers have low flexural strength.

However, this compartmentalization has its dangers; it can lead to specialization (the metallurgist who knows nothing of ceramics) and to conservative thinking ("we use steel because that is what we have always used"). It is this specialization and conservative thinking that has limited the consideration of simply binding together inorganic aggregates to make a variety of products, such as in connection with the food and beverage industry. It has now been found that both structurally and environmentally sound compositions can be microstructurally engineered from these materials and made into a variety of useful products previously made almost exclusively from paper, plastic, and polystyrene, such as food and beverage containers used in the fast-food industry.

The design of the compositions of the present invention have been developed and narrowed, first, by primary constraints dictated by the design, and then by seeking the subset of materials which maximize the performance of the components. At all times during the process, however, it is important to realize the necessity of designing products which can be manufactured by a cost-competitive process. After all, rather than being a mere abstraction, the products of the present invention are intended to completely replace most, if not all, of the materials presently used in the mass food and drink packaging industry.

The primary constraints in materials selection are imposed by design characteristics and components which are critical to a successful product. With respect to a food or beverage container, those primary constraints include maximizing strength and toughness, while minimizing weight and cost, essentially making the products comparable to their paper and plastic counterparts.

One of the practical constraints for any mass-produced container for food and beverages is that of time of manufacture. In order for the manufacturing process to be economically viable, not only must the raw materials be readily available and inexpensive, but the mixing and molding processes must be fast and amenable to mass production procedures. A problem with prior art hydrated mixtures (such as concrete) has been the time it takes to work, mold, and then cure the hydrated cementitious material. In addition, such mixtures typically take days or weeks to reach their maximum strength. Such time periods are certainly impractical for products which are intended to be mass-produced, or which are disposable.

As a result, a critical feature of the present invention is that molded hydrated mixture will maintain its shape (i.e., support its own weight subject to minor forces) in the green state without external support. The molded container rapidly (in a matter of minutes, or even seconds) achieves sufficient strength so that it can be handled, even though the hydrated mixture may still be in the green state. In addition, the containers of the present invention harden within a matter of hours, and achieve a substantial portion of their maximum possible strength within a day or two.

Another advantage of the microstructural engineering approach of the present invention is the ability to develop compositions in which cross-sections of the structural matrix are more homogeneous than those that have been typically achieved in the prior art. Ideally, when any two given cross-sections of about 1–2 mm$^2$ of the structural matrix are taken, they will have substantially similar amounts of voids, aggregates, fibers, and other additives or properties of the matrix.

From the following discussion, it will be appreciated how each of the component materials in the hydrated mixture work to meet the primary design constraints. Specific materials and compositions are set forth in the examples to demonstrate how the maximization of the performance of each component accomplishes the combination of desired properties.

B. Food and Beverage Containers.

The terms "container" or "containers" as they are used in this specification and the appended claims, are intended to include any receptacle or vessel utilized for storing, dispensing, packaging, or portioning items, whether such use is intended to be short term or long term. Examples of "containers" include boxes, cups, jars, bottles, plates, cartons, cases, crates, dishes, egg cartons, lids, straws, other types of holders, and cushioning materials therein. It will be appreciated that in certain circumstances the container may seal the contents from the external atmosphere and in other circumstances may merely hold or retain the items.

The terms "disposable container," or "disposable containers," as they are used in this specification and the appended claims, refer to cups or containers which have the characteristics typically associated with disposable containers on the market. That is to say, the food or beverage container (a) is manufactured in such a way that it is economical for the container to be used only once and then discarded, and (b) has a construction such that it can be readily discarded or thrown away in conventional waste landfill areas as an environmentally neutral material (without causing significant extraordinary environmental hazards). The use of the term "disposable" does not mean that the container must necessarily only be a single-use food or beverage container and be discarded after only one use.

The terms "food" and/or "beverage" are used collectively and often interchangeable herein. It is the objective of the present invention to develop products for use with food and beverages. Accordingly, the design of the materials used in the containers of the present invention have been developed to accommodate the specific needs of storing, dispensing, packaging, and portioning food and beverage products. The present invention is of particular use in the "fast-food" industry where disposable cups, "clam-shell" containers, and other food and beverage containers are frequently used to dispense food and beverages.

It should be understood that the food and beverage containers of the present invention are generally intended to come into direct contact with food or beverages, although there may be other uses for which such containers may have some utility.

C. Organic Binders.

The term "organic binder," as used in this specification and the appended claims, is intended to include all polysaccharide binders, including natural and modified cellulose and starch based binders, protein based binders, and synthetic binders which are useful in binding together a variety of inorganic aggregate materials into containers which are useful for storing, dispensing, and packaging food or beverages.

Suitable cellulose based materials include, for example, methylhydroxyethylcellulose (such as TYLOSE®), hydroxymethylethylcellulose, carboxymethylcellulose, methylcellulose, ethylcellulose, hydroxyethylcellulose, hydroxyethylpropylcellulose, etc. The entire range of possible permutations is enormous and cannot be listed here.

Suitable starch based materials and modified derivatives of starch include, for example, amylopectin, amylose, seagel, starch acetates, starch hydroxyethyl ethers, ionic starches, long-chain alkyl starches, dextrins, amine starches, phosphate starches, and dialdehyde starches.

Other polysaccharide based natural products and modified derivatives include, for example, alginic acid, phycocolloids, agar, gum arabic, guar gum, locust bean gum, gum karaya, and gum tragacanth.

Suitable protein based binders and modified derivatives of protein include, for example, Zein® (a prolamine derived from corn), collagen derivatives extracted from animal connective tissue, such as gelatin and glue, and casein (the principal protein in cow's milk).

Another suitable natural binder is latex.

Suitable synthetic binders include, for example, PVP, polyvinyl alcohol, polyvinylmethyl ether, polyacrylic acids, polyacrylic acid salts, polyvinylacrylic acids, polyvinylacrylic acid salts, polyacrylimides, and ethylene oxide polymers.

All of these natural products, their derivatives, and the synthetics have properties similar to TYLOSE® and can be used in place of TYLOSE® in the present invention depending on the application.

It should be understood that cellulose based products and starch based products are closely related as far as their chemical composition and structure are concerned. Both are polysaccharides consisting of long chains of D-glucose, the primary difference being the orientation of the bonds linking the individual glucose molecules together. Both can be cheaply and efficiently extracted from most plant matter, including both terrestrial and sea plants. Both are highly polar substances containing large amounts of oxygen, primarily in the form of hydroxyl groups. Therefore, they can be made water soluble or water insoluble depending upon where and what groups are substituted thereon.

The only limiting features of any of the foregoing organic binders is that the binder must preferably impart a rheology to the mixture so that it may be shaped into the desired container for food or beverages, and then exhibit sufficient form stability so that the molded container will maintain its shape even while in the green state. Nevertheless, it should be understood that in some applications, form stability, usually in the form of partial or complete curing, is achieved while the container is still in the mold, usually as a result of heating the mold.

The organic binders used in the present invention are activated when mixed with water, they bind inorganic aggregates into a structural matrix, and thereafter allow the container to disintegrate into environmentally benign byproducts upon prolonged exposure to moisture. In addition to moisture, pressure within the landfill into which the container will be disposed will also cause the food or beverage container to crumble and disintegrate into essentially the components of the earth. It is an important feature of the food and beverage containers of the present invention that they do not require organic decomposition (as must occur with both paper or plastic) before they will disintegrate into environmentally benign substances.

A preferred polysaccharide binder is TYLOSE®, which is available from Hoechst Aktiengesellschaft located in Frankfurt, Germany. TYLOSE® is a polysaccharide comprising methylhydroxyethylcellulose and is employed as a plasticizing agent in the related co-pending application Ser. No. 07/929,898, identified above. However, during the course of the experimentation that both preceded and followed the filing of that application, it was found that TYLOSE® could also act as a binder under some circumstances, depending on the other constituent materials within the composition.

Three of the TYLOSE® products that are used include TYLOSE® 4000, TYLOSE® 15002 and TYLOSE® MHB 30000 p, wherein 2% solutions in water have viscosities of 4,000 cps, 15,000 cps, and 30,000 cps respectively, measured at 20° C. Nevertheless, any methylhydroxyethylcellulose or other polysaccharide binder of any viscosity which exhibits similar binding properties is within the scope of this disclosure and the claims that are amended hereto.

The important properties which make TYLOSE® especially useful are that it is hygroscopic and forms a gel when mixed with water, and is able to bind the aggregate particles (and fibers, if added) together through polymeric bridging of the surfaces of the individual particles, forming a mixture with a rheology similar to that of clay.

In addition, any of the other substituted and unsubstituted cellulose materials listed above which exhibit similar binding properties as TYLOSE® are also within the scope of this disclosure and the claims that are amended hereto. In fact, any cellulose or substituted cellulose based material that can bind inorganic aggregates together into a suitable packaging container for food and beverages as disclosed herein is well within the purview of this application.

Preferred starch based binding materials include amylopectin, amylose, and sea-gel. Amylopectin and amylose are natural starch products which are easily derived from a variety of plants, vegetables, or grains, such as corn or sorghum. Sea-gel is another preferred starch based binding material and is derived from seaweed. Similarly, agar is a polysaccharide material that is also extracted from seaweed. A preferred protein-based organic binder is Zein®, a protein product derived from corn. A preferred synthetic organic binder is PVP.

One important criterion for a food or beverage container is that it maintains its strength during the duration of its use. This includes being resistant to water, which tends to dissolve many of the binders within the present invention. Nevertheless, this degradation process can be slowed by altering the composition of the container and by applying a coating to the container, as more fully discussed below. Moreover, after the container has been discarded such degradation is actually beneficial and results in a more environmentally compatible waste product compared to conventional food or beverage containers on the market.

D. The Hydrated Materials.

In each embodiment within the present invention, the hydrated organic binder is the constituent which gives the hydrated material the ability to set up and develop strength properties. The term "hydrated binder paste" shall refer to organic binder which has been hydrated by the addition of water. The term "hydrated mixture" shall refer to a hydrated binder paste containing aggregates, fibers, or other materials, whether in the green state (i.e., uncured) or after it has solidified and/or cured. Thus, the hydrated mixture comprises a uniformly mixed mass of the various products within the mixture. All of the other ingredients besides the organic binder serve the purpose of altering the properties of the final product, including, but not limited to, strength, shrinkage, flexibility, insulating ability, color, porosity, surface finish, and texture.

The percentage of organic binder within the overall mixture varies depending on the identity of the other added constituents. However, the binder is preferably added in an amount ranging up to about 10% as a percentage by weight of the wet hydrated mixture. From the disclosure and examples set forth herein, it will be understood that this wide range of weights corresponds to situations where the volume of the binder in the hydrated mixture may vary from 0.25% or less to more than 20% of the volume of the hydrated mixture.

It will be appreciated from the foregoing that embodiments within the scope of the present invention will vary from a very lightweight "foam-type" product to a somewhat heavier "clay-type" product. In between, it is common to incorporate significant aggregates into a "foam-type" product resulting in the "foam/clay" product which has many of the qualities of both the "foam" and "clay" products, including relatively high strength and good insulation ability. Hence, the amount of the various components will vary depending upon the specific product to be made.

Generally, the preferred range for the amount of organic binder in the "foam-type" products will be within the range from about 0.25% to about 10% by weight of the hydrated mixture, and most preferably within the range from about 0.5% to about 5%. The preferred range for the amount of binder in the "foam/clay" products will generally be within the range from about 0.25% to about 20% by weight of the hydrated mixture, and most preferably within the range from about 0.5% to about 5%. With respect to the "clay-type" products, the amount of binder will be within the range from about 0.25% to about 20% by weight of the hydrated mixture, with the preferred amount being within the range from about 0.5% to about 10%, and the most preferred range being from about 1% to about 6%.

Despite the foregoing, it will be appreciated that all concentrations and amounts are critically dependent upon the qualities and characteristics that are desired in the final product. For example, in a very thin walled structure (even as thin as 0.020 inch) where strength is needed, such as in a drinking straw, it may be more economical to have a very high percentage of organic binder and fibers with little or no inorganic aggregate.

Conversely, in a product in which high amounts of air are incorporated, such as a lightweight food or beverage container, there may be a much greater percentage of lightweight aggregates, such as hollow glass spheres, and a smaller amount of binder. Such materials can literally be as light as the lightest styrofoam products.

It is important that the water content be carefully controlled in order to result in a hydrated mixture that is self-supporting in the green state. Nevertheless, the amount of water to be used is dependent upon a variety of factors, including the type of binder, aggregates, fibers, and other materials or additives added to the hydrated mixture, the relative concentrations of each of these components, the molding or forming process to be used, and the shape and properties of the specific product to be made.

Nevertheless, in typical compositions within the scope of the present invention, the amount of water will fall within the range from about 10% to about 80% by volume of the hydrated mixture. This range is broad because it covers "foam-type," "clay-type," and "foam-clay" products.

"Foam-type" products will preferably contain water in an amount within the range from about 50% to about 80% by volume, and most preferably, within the range from about 60% to about 75%. The amount of water in the "foam/clay" products will generally be about the same as the "foam-type" products. On the other hand, the "clay-type" products will preferably contain water in an amount within the range from about 10% to about 45%, and most preferably, within the range from about 20% to about 35%.

According to the presently contemplated best mode of obtaining large amounts of finely dispersed air voids, such as in the "foam-type" or "foam-clay" products, it has been found desirable that the water, Tylose®, and air entraining agent be mixed in a high energy shear mixture such as that disclosed and claimed in U.S. Pat. No. 4,225,247 entitled "Mixing and Agitating Device" and U.S. Pat. No. 4,552,463 entitled "Method and Apparatus for Producing a Colloidal Mixture."

For purposes of understanding such high energy mixers and their methods of use, the disclosures of the aforesaid U.S. Pat. Nos. 4,225,247 and 4,552,463 are incorporated herein by specific reference. High energy mixers within the scope of these patents are available from E. Khashoggi Industries of Santa Barbara, Calif. The use of such a high energy mixer during the mixing process also results in a more homogeneous mixture in those embodiments where fibers and/or other aggregates are also mixed under high speed mixing conditions.

E. Nonfibrous Aggregates.

It is within the scope of the present invention to include aggregates within the hydrated mixture. Depending on the food or beverage container being made, one purpose for adding aggregates might be to make the cured material more lightweight and insulative, rather than to increase its strength. In other embodiments where insulation and weight are not as important as either strength or low cost, different aggregates can be added which merely impart bulk or which add significant strength to the cured structural matrix. Aggregates can be either organic or inorganic, although they are typically inorganic.

Examples of inorganic aggregates which can add a lightweight characteristic to the hydrated mixture include perlite, vermiculite, glass beads, hollow glass spheres, aerogels, exfoliated rock, lightweight concrete, lightweight expanded clay, expanded fly ash, expanded slag, pumice, lightweight synthetic materials (e.g., porous ceramic spheres, tabular alumina, aerogels, etc.), and any other lightweight and environmentally benign aggregate.

In addition, some organic, polymeric, or elastomeric aggregates, such as cork or plastic spheres can be used as an aggregate material to impart lightweight properties or flexibility into the finished product.

Examples of inorganic aggregate materials which mainly impart bulk and/or strength to the hydrated mixture include clay, sand, gravel, rock, limestone, calcium carbonate, sandstone, and gypsum (including calcium sulfate, and the hemihydrate and dihydrate of calcium sulfate).

In addition to these conventional aggregates used in the cement and plaster industries, a wide variety of other aggregates, including fillers, strengtheners, including metals and metal alloys (such as stainless steel, calcium aluminate, iron, copper, silver, and gold), balls or hollow spherical materials (such glass, polymeric, and metals), filings, pellets, powders (such as microsilica), and fibers (such as graphite, silica, alumina, fiberglass, polymeric, organic fibers, and such other fibers typically used to prepare various types of composites), may be added to the hydrated mixture within the scope of the present invention. Even organic materials such as seeds, starch granules, solid gelatins, and solid agar-type materials can be incorporated as aggregates in the present invention.

In order to increase the flexibility of the resulting food or beverage container, lightweight plastic spheres can be added to the hydrated mixture.

Both clay and gypsum are particularly important aggregate materials because of their ready availability, extremely low cost, and ease of working and formation, and because they can also provide some degree of binding if added in high enough amounts. With regard to clay, the Brady, G. S. & Clauser, H. R., Materials Handbook (13th ed.), pp. 205–06, stated that "clay is the general term used to identify all earths that form a paste with water and harden when heated" (emphasis added). Most clays chiefly comprise silica and alumina, and are used for making pottery, tiles, brick, and pipes. The clay-like material in all clays is kaolinite, which generally takes two forms, anauxite $(Al_2O_3.3SiO_2.2H_2O)$ and montmorillonite $(Al_2O_3.4SiO_2.H_2O)$. However, clays have a wide range of compositions and contain other substances such as iron oxide, titanium oxide, calcium oxide, zirconium oxide, and pyrite.

According to the Materials Handbook, methylcellulose is used as a binder in some clay products, gives good binding strength, and fires out of the ceramic with an ash residue of only 0.5%. In addition, although clays have been used for millennia and can obtain form stability even without being fired, such unfired clays are vulnerable to water and have never been used to form food and beverage containers which have utility in the fast food industry. Nevertheless, if clay is included in large enough amounts, it can impart some degree of binding to the hydrated mixture.

Similarly, gypsum is also hydratable and forms the dihydrate of calcium sulfate when water is added. Thus, if gypsum is included in large enough amounts within the hydrated mixture, it can also impart some degree of binding to the hydrated mixture. Nevertheless, below this minimum amount, gypsum adds no appreciable binding strength to the mixture and should be considered an aggregate only.

It should be understood that the amount of the aggregate will vary depending upon the application. However, in most situations, the amount of the aggregates will not exceed about 90% by weight of the hydrated mixture. In the products contemplated by the present invention the amount of aggregate will preferably be within the range from about 5% to about 80% by weight of the hydrated mixture, more preferably within the range from about 15% to about 70%, and most preferably within the range from about 30% to about 60%.

In the products contemplated by the present invention where the concern for insulation and low weight are not controlling, it is best to use an aggregate that imparts as much strength as possible at the lowest possible cost. In any event, the amount of aggregate in this embodiment will preferably be within the range from about 20% to about 90% by weight of the hydrated mixture, more preferably within the range from about 40% to about 75% and most preferably within the range from about 45% to about 65%.

In sharp contrast to clay, gypsum, or other aggregates used to add bulk to the hydrated mixture, lightweight, highly-insulative food and beverage containers can be made to incorporate aggregates which contain large amounts of trapped or interstitial air. This interstitial air makes these aggregates highly insulative and lightweight. Such aggregates include hollow glass spheres, aerogels, perlite, vermiculite, pumice, exfoliated rock, etc. Because these aggregates are so much lighter than aggregates such as sand, clay, or gravel, they will usually constitute a smaller percentage of the overall weight of the container, while nevertheless imparting an equal or greater amount of volume. Typically, the amount of lightweight aggregates will preferably be in the range from between about 10% to about 60% by weight, more preferably within the range from between about 20% to about 50%, and most preferably, within the range from about 30% to about 40%.

Further, it will be appreciated that for any given product, certain aggregates may be more preferable to others, while others may not be usable for a particular use. For example, certain of the aggregates may contain materials that could leach from the structural matrix depending on the container's use; nevertheless, most of the preferred materials are not only nontoxic for most uses within the food and beverage industry, but they are also more environmentally neutral than components in existing products.

Fibrous aggregates are used primarily in the present invention to add form stability to the uncured hydrated mixture and to add strength and flexibility to the resulting cured structural matrix. Certain fibers may also impart some level of insulation to the materials, while reducing their weight somewhat. Nevertheless, the term "aggregates" will refer to all other aggregate materials which are nonfibrous and whose function is mainly to impart bulk, strength, and rheological, textural, and insulative properties to the materials.

It is also within the scope of the present invention to include set hydraulic cement compositions as added aggregate materials. Examples of hydraulic cement compositions include used cementitious food and beverage containers of the invention set forth in the aforementioned copending application Ser. No. 07/929,898 (now abandoned), which can be recycled and used as aggregates in the noncementitious food and beverage containers of the present invention. Moreover, due to more restrictive environmental legislation, many ready-mix concrete suppliers are often obligated to find adequate means of handling, recycling, and marketing their waste solids. The present invention sets forth a use for such waste solids.

For many uses, it is preferable to include a plurality of differently sized and graded aggregates wherein the smaller aggregates are capable of filling interstices between the larger aggregates. In such cases, the differently sized aggregates would typically have particle sizes in the range from as small as about 0.5 microns to as large as about 2 inches. (Of course, the different uses of the resulting containment product will dictate the preferred properties of the structural matrix and the appropriate size of the aggregates to be used.) It is within the skill of one in the art to know generally which aggregates are to be used to achieve the desired characteristics in the final article or structure.

In certain preferred embodiments of the present invention, it is desirable to maximize the amount of the aggregates in the hydrated mixture in order to maximize the properties and characteristics of the aggregates (such as their lightweight or insulative qualities). In order to maximize the amount of the aggregates, the use of particle packing techniques is desirable. A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the thesis of Anderson, P. J. "Control and Monitoring of Concrete Production—A Study of Particle Packing and Rheology," The Danish Academy of Technical Sciences (1990).

The advantages of using particle packing techniques can be further understood by reference to the examples which follow in which hollow glass spheres of varying sizes are mixed in order to maximize the amount of the glass balls in the hydrated mixture. In particular, efficient particle packing can be achieved by using a mixture of relatively equal amounts of fine, medium, and course hollow glass spheres, which have particle sizes of up to 40 microns, 40–60 microns, and 60–100 microns, respectively.

By using this particle packing technique, the interstices between the courser hollow glass spheres can be filled by the medium and fine hollow glass spheres, thus allowing a greater mass of glass spheres to be packed into the same volume compared to the case where efficient particle packing is not obtained. This results in lower water requirements, greater insulation ability, higher strength, and smoother surfaces of the food or beverage container.

In embodiments in which it is desirable to obtain a food or beverage container with high insulation capability, it is preferable to incorporate into the structural matrix an aggregate which has a low thermal conductivity, or "K-factor." The preferred aggregates include expanded or exfoliated vermiculite, perlite, calcined diatomaceous earth, lightweight concrete, and hollow glass spheres—all of which tend to contain large amounts of incorporated interstitial space.

This interstitial space, which is comprised of microscopically small fixed air spaces, greatly lowers the K-factor of these aggregates, thereby greatly increasing the insulation capability of the food or beverage container involved. However, this list is in no way intended to be exhaustive, these aggregates being chosen because of their low cost and ready availability. Nevertheless, any aggregate with a low K-factor, which is able to impart sufficient insulation properties into a food or beverage container of the present invention is within the purview of the present invention.

F. Fibrous Materials.

Fibers are a special kind of aggregate which can be added to the hydrated mixture to increase the toughness and flexural, tensile and compressive strengths of the resulting structural matrix. The concept of adding fibers is analogous to reinforcing concrete with steel bars or wire, except that the reinforcement is on a "micro" rather than "macro" level. The use of the fibers dramatically increases the fracture energy of the structural matrix, which makes the resulting products particularly useful in containing food and beverages.

The fibers which are incorporated into the structural matrix are preferably naturally occurring fibers, such as fibers extracted from plant leaves and stems, usually comprising cellulose. Other suitable fibers include fibers made from glass, silica, ceramic or metal. (One of the glass fibers utilized in the specific examples which follow is CEM-FILL®, a product manufactured by Pilkinton Corp.) The only limiting criteria is that the fibers impart the desired properties without contaminating the foodstuffs stored or dispensed in the food or beverage container containing such fibers.

Preferred fibers of choice include glass fibers and abaca fiber, which is extracted from a type of banana plant within the hemp family found in the Philippines. The abaca fibers used in the examples which follow were purchased from Skamol Corp. These fibers were used due to their low cost, high strength, and ready availability. Nevertheless, any equivalent fiber which imparts strength, as well as flexibility if needed, is certainly within the scope of the present invention. Either organic or inorganic fibers can be used in a given application, the main consideration being to minimize costs.

It is preferable that the fibers have a minimum length to width ratio (or "aspect ratio") of at least 10:1. However, a greater aspect ratio is better since a longer, narrower fiber is able to impart a greater amount of strength to the structural matrix without adding more bulk and mass to the mixture. Fibers with an aspect ratio of greater than 100:1 are more preferred, while an aspect ratio of between 200:1 to 300:1 is most preferred.

Another important consideration is the length of the fibers relative to the length of the other aggregates within the structural matrix. The fibers are preferably at least twice the average length of the aggregate particles, more preferably at least 10 times the average length, and most preferably at least 100 times the average length. High fiber to average aggregate particle length ratios can be achieved either by increasing the absolute length of the added fibers or, alternatively, by using smaller aggregates. For example perlite, vermiculite, pumice, and other lightweight aggregates are extremely large compared to individual clay particles. Thus, a high fiber length to aggregate length ratio is far more easily attained where clay is the aggregate.

Microscopic analysis of materials made according to the present invention show that the mixing and molding processes tend to circumferentially and generally unidirectionally orient the fibers in the wall of the food or beverage container. It will be readily appreciated how this results in the advantageous properties discussed above.

As with aggregates, the amount of the fibers added to the hydrated material will vary depending upon the desired product. Since the purpose of the fibers is usually to add strength, this becomes the principal criterion for determining the amount of fibers to be added. Nevertheless, in most situations the amount of fiber will not exceed about 20% by volume. In both the "foam-type" and the "clay-type" products contemplated by the present invention, the amount of fiber will generally be within the range from about 0.5% to about 10% by volume, and most preferably, within the range from about 1% to about 6% by volume.

G. Air Voids.

In those applications where insulation is an important criteria (whether it is desired to insulate hot or cold materials), it is an important aspect of the present invention that the structural matrix of the food or beverage container contain air pockets or voids in addition to, or in place of, aggregates in order to increase the container's insulative properties. The incorporation of air voids into the hydrated mixture is carefully calculated to impart the requisite insulation characteristics without degrading the strength of the container to the point of nonutility. Generally, however, if insulation is not an important feature of a particular product, it is desirable to minimize any air voids in order to maximize strength and minimize weight and volume.

In certain embodiments, air pockets can be introduced by high shear, high speed mixing of the hydrated mixture with a foaming or air entraining agent added to the mixture to aid in the incorporation of air pockets. The high shear, high energy mixers discussed above are particularly adept in achieving this desired goal. Suitable foaming and air entraining agents include commonly used surfactants and materials; currently preferred embodiments of such surfactants include a polypeptide alkylene polyol (Mearlcrete® Foam Liquid) and a synthetic liquid anionic biodegradable solution (Mearlcel 3532®), both available from the Mearl Corporation in New Jersey.

In this process, a gas can also be injected into the hydrated mixture such that it is substantially uniformly incorporated by the high energy mixer and then stabilized by the foaming and stabilizing agents. A variety of different gases can be utilized; many inexpensive gases suitable for use in the hydrated mixture are available, such as carbon dioxide.

This process of incorporating gas into the hydrated mixture is generally suitable for processes where the hydrated mixture is relatively nonviscous, such as in injection molding where the hydrated material is injected through small holes.

In the process of molding and/or curing the hydrated mixture, it is often desirable to heat the hydrated mixture in order to control the air void system and to aid in making the material form stable in the green state (immediately after molding). Of course, this heating aids in rapidly removing significant amounts of water from the hydrated mixture.

If a gas has been incorporated into the hydrated mixture, heating that mixture to 250° C. will result (according to the gas-volume equation) in the gas increasing its volume by about 78%. When heating is appropriate, it has been found desirable for the heating to be in the range from about 80° C. to about 250° C. Importantly, when controlled, this heating will not result in cracks in the structural matrix of the container or imperfections in the surface texture of the container.

In other applications, where viscosity of the hydrated mixture is high, such as in roller casting or ram pressing, it is much more difficult to obtain adequate numbers of air voids through high shear mixing. In this case, air voids are alternatively introduced into the hydrated mixture by adding a highly alkaline material (such as sodium hydroxide), along with an easily oxidized metal, such as aluminum, zinc, or tin. For this method of introducing entrained air, it is preferable to adjust the pH to be within the range of about 13–14.

The highly alkaline conditions in this mixture cause these metals to undergo oxidation, while some of the ions (such as hydrogen ions) present in the water are concomitantly reduced to a gaseous product (such as hydrogen gas), which then becomes dispersed throughout the hydrated mixture in the form of microscopic bubbles. A stabilizing agent is also preferably added so that the air bubbles are maintained within the hydrated mixture while it cures. Vinsol resin is one presently preferred stabilizing agent; this compound is commonly available, but that which was used in the examples which follow was obtained from Sika Company.

Often, it is further desirable to heat the mixture in order to increase or control the rate of oxidation and facilitate the formation of hydrogen bubbles. It has been found that heating the molded product to temperatures in the range or from about 50° C. to about 100° C., and preferably about 75° C. to about 85° C., effectively controls the reaction as well as drive off a significant amount of the water. Again, this heating process does not result in the introduction of cracks into the matrix of the molded product.

It has also been discovered that, after the food or beverage container has solidified, many of the compositional designs of the present invention result in a matrix that is slightly permeable, especially to tiny hydrogen gas molecules, which can diffuse out of the structural matrix. In addition, this "breatheability" factor is highly desirable in certain types of food containers, such as the "claim-shell" containers used in the fast food industry.

This second method of introducing air voids into the hydrated mixture can be used in conjunction with, or in place of, the introduction of air through high speed, high shear mixing in the case of low viscosity hydrated mixtures used in injection molding. Air voids not only increase the insulative properties of the resulting container, but also greatly decrease the bulk specific gravity, and hence the weight, of the final product. This reduces the overall mass of each container, which reduces the amount of material that goes into the manufacture of the container, and the amount of material that will ultimately be disposed of in the case of disposable food and beverage containers.

Aluminum and zinc are the preferred metals of choice because of their relatively low cost compared to other metals which undergo oxidation when exposed to basic conditions. Nevertheless, it should be understood that any metal that is easily oxidized when exposed to highly alkaline conditions would work equally well and would be within the scope of the present invention.

H. Protective Coatings.

Each of the component materials within the food and beverage containers according to the present invention is harmless to humans and animals. However, it is sometimes desirable to provide the food and beverage containers of the present invention with a protective coating, especially where the binder is vulnerable to moisture. In one embodiment, the containers are coated and sealed with a layer of calcium carbonate to ensure that they are impermeable to liquids, and to prevent seepage. This additional feature not only provides an adequate seal of the container, but also ensures the absolute safety of the container. Besides calcium carbonate, any FDA approved coating material would work depending on the application involved.

For example, an FDA-approved coating comprised of sodium silicate, which is acid resistant, is a particularly useful coating. Resistance to acidity is important, for example, where the container is exposed to foods or drinks having a high acid content, such as soft drinks or juices. Where it is desirable to protect the container from basic substances, the container can be coated with an appropriate polymer or wax, such as are used to coat paper containers.

It has also been found that the use of a heavier weight rheology-modifying agent, such as Tylose® MHB 30,000 p even in a concentration of only 0.15 volume percent of the total mixture volume, not only increases the form stability of the molded product, but it also reduces the absorption of aqueous liquids into the matrix of the resultant cementitious product. This results in minimizing the porosity at the surfaces of the cementitious container to cause an effective sealing of the surfaces against water absorption.

In some applications, such as in the case of warm, moist food, it is important that the coating allow the container to "breathe," or be permeable to water molecules, while still maintaining its ability to keep the steamy food product fairly insulated. In other words, in a "breathable" container, water cannot pass through the wall of the container, but water vapor can. Such a breatheability feature is important when serving certain food products such as hamburgers so that the bread does not become soggy.

Another type of coating that may be placed on the surface of the food or beverage container of the present invention is a reflective coating for reflecting heat into or out of the container. Such reflective coatings are well known in the art, although their applicability for food and beverage containers comprising bound aggregates is novel.

While the specific coating which may be used will depend upon the desired features for the final products, most coatings will be applied in a solvent so that upon evaporation of the solvent the coating remains on the surface exposed to the food or beverage product. Examples of suitable coatings include melamine, Zein®, polyvinyl chloride, polyvinyl alcohol, polyvinyl acetate, sodium silicates, calcium carbonates, polyacrylates, and ceramics.

I. Other Materials.

For commercial purposes, it is also desirable that the surfaces of the food and beverage containers be capable of receiving ink or other printing indicia. Of course, bound inorganic aggregate products such as those disclosed herein are particularly well suited for such a use. Furthermore, as mentioned above, it is within the scope of the present invention to coat the food or beverage container with an FDA-approved coating, most of which are currently used and well adapted for placing indicia thereon.

Indeed, calcium carbonate is well known in the printing industry as been an effective surface on which indicia can be placed. Hence, most of the presently known prior art methods with regard to printing or placing indicia on food or beverage containers can be used in connection with the present invention. Not only can decals be placed on the surface, but the porosity of the bound aggregate surface itself is such that it will properly absorb ink without running; even multiple color or multiple layer printing is relatively easily achieved.

In order to obtain a food or beverage container with a smoother surface, it may be preferable to include a small amount of polyethylene glycol (with a minimum molecular weight of 20,000) within the hydrated mixture.

II. Specific Functions of Materials Within the Containers.

It is important to the present invention that the basic structural components of the food and beverage containers of the present invention include aggregates held together by an appropriate organic binder. Within this basic structural matrix are incorporated a variety of components which add certain preselected characteristics and properties, such as fibers, aggregates, air voids, and stabilizing agents.

A. Purposes of Components in the Structural Matrix.

As discussed above, fibers are added to impart strength and some insulation to the food or beverage container. Aggregates are often employed to increase the container's ability to insulate and to decrease the bulk specific gravity of the hydrated mixture. In other occasions, such as where the aggregate consists of clay or other like materials, the aggregate merely adds bulk and strength to the food or beverage container at the lowest possible cost. Discontinuous, nonagglomerated air voids can be mechanically or chemically introduced into the hydrated mixture; these voids would also greatly decrease the bulk specific gravity of the final product, making it more lightweight and insulating.

Because this invention is directed toward food or beverage containers which are intended to come into contact with foodstuffs, the materials within the containers must not contain, or impart into the food or beverages therein, any hazardous substances. The containers are typically comprised of one or more aggregates, one or more fibers, and an environmentally compatible binder. Appropriate binders that can be used herein comprise polysaccharides and their derivatives, proteins and their derivatives, and hydratable synthetic materials as set forth more fully above. These materials are generally nontoxic to humans and animals both before and after hydration and their admixture with appropriate aggregates.

The fibers used herein are preferably natural fibers made from cellulose or glass fibers. Either type of fiber is harmless to humans and animals. The aggregates used in this invention are preferably small, lightweight rock-like substances, which are also very stable, unreactive, and harmless to humans and animals.

The size of the aggregates is controlled so that they are preferably about one-fourth (or smaller) of the thickness of the containers to be manufactured. As mentioned above, it is frequently desirable to employ particle packing techniques in order to maximize the desirable properties and characteristics of the aggregates into the hydrated mixture and cured structural matrix. Simply stated, these techniques maximize the amount of the aggregates in the matrix and minimize the space (and hence the discontinuities) between the aggregates. Thus, the strength and other properties of the structural matrix become dependent upon that of the aggregates and the binder that is used.

The air voids which are chemically introduced are most likely to be filled with air after the hydrogen diffuses out of the structural matrix. (Although, as taught elsewhere, other similarly safe gases can be used in the manufacturing process.) Contrast this with polystyrene foam containers wherein the air pockets might contain harmful CFC's or other gaseous agents involved in the manufacture of polystyrene. Likewise, paper products are known to contain tiny quantities of dioxin, as discussed above.

The food and beverage containers of the present invention are lightweight, yet retain the sufficient strength for the desired purpose. Preferably, compositions of the present invention will have a bulk specific gravity of less than 1.0 g/cm$^3$. Typically, the food and beverage containers will have a strength to bulk density ratio in the range from about 0.5 to about 10 MPa-cm$^3$/g. In the preferred embodiments, the strength to bulk density ratio will usually be in the range from about 1 to about 8 MPa-cm$^3$/g, with the most preferred range being from about 2 to about 5 MPa-cm$^3$/g.

A significant advantage of the food and beverage containers according to the present invention is that they do not require or result in the emission of dioxin or ozone depleting chemicals. In addition, when disposed of into the earth, they do not persist in the environment as do foreign materials which must biodegrade (often over a number of years) before they become environmentally innocuous. Instead, the waste container is essentially composed of the same materials already found in the earth. Under the weight and pressure of typical landfills, such containers will crumble and break down into an environmentally neutral powder that is the same as, or at least compatible with, the dirt and rock already found in the landfill. This decomposition process is accelerated if the food and beverage containers are also exposed to moisture.

Furthermore, the food and beverage containers of the present invention are fully recyclable with a minimum amount of energy and effort. Unlike paper and plastic products, which require a substantial amount of processing in order to restore them to a suitable state as raw starting materials, containers made from bound aggregates can be ground up and reincorporated into new containers as an aggregate component, or, in some cases, rehydrated and reformed without the addition of any new ingredients. This ability of the containers of the present invention to be reformed simply by adding water and remixing the component parts is a strong departure from food and beverage cups and containers made from polystyrene and paper, each of which can only be recycled through detailed processes requiring the input of large amounts of energy and which result in the emission of large amounts of waste water.

B. The Processing Techniques and Conditions.

The combination of organic binders, aggregates, air voids and fibers result in a composition that can be formed into relatively thin sheets or walls having roughly the same thickness as conventional cups and containers made from paper or styrofoam. The compositions are readily molded or processed into a variety of shapes, including cups, containers, plates, "clam-shell" cartons, boxes, straws, lids, and similar products. The resulting food and beverage containers also have low bulk density (often the bulk specific gravity is less than 1.0), resulting in a lightweight product which is comparable to conventional disposable cups and containers made of styrofoam and paper.

In order for the material to exhibit the best properties of high flexural strength and insulation, the fibers can be aligned or stacked according to the present invention, instead of being randomly dispersed, throughout the structural matrix. It is preferable for the fibers to be laid out in a plane that is parallel to either of the two surfaces of the wall of the container. In a cup, it is important, therefore, for the fibers within the cup body to be circumferentially, preferably unidirectionally, aligned. Similarly, the fibers within the bottom of the cup should be horizontally aligned.

Such alignment of fibers is achieved either by roller casting, ram-pressing, pull-trusion, hot pressing, or high pressure extrusion of a plastic matrix. These processes result in near zero porosity in terms of large, continuous and unwanted air pockets which can occur using other mixing or molding methods. This greatly increases the flexural strength of the structural matrix and reduces the tendency of splitting or tearing when the container is exposed to external mechanical forces.

An important feature of the present invention is the requirement that the entrained air be fairly uniformly dispersed into nonagglomerated voids, rather than being randomly dispersed into relatively large, agglomerated pockets. This is accomplished by using a high energy, high speed mixer, or through the addition of a base along with reactive metals. Large and randomly dispersed voids offer little in terms of added insulative properties, while at the same time greatly reducing the consistency and strength of the structural matrix. In contrast, finely and uniformly dispersed air voids greatly increase the insulative ability of the final product without substantially reducing the strength of the structural matrix.

Food and beverage containers incorporating large amounts of gas bubbles or voids and made by this method exhibit the insulating properties similar to those of styrofoam containers, yet have sufficient strength so that they will not break when dropped from heights as high as 2 or more meters. For example, food and beverage containers made according to the present invention have been shown to provide sufficient insulation for hot drinks (the outside of the container will have a maximum temperature of about 52° C. when the temperature is 88° C. on the inside) or hot food products over the time period typically used in the dispensing of such food and beverages in the fast food industry. In addition, the materials have demonstrated the ability to keep foods (including even ice cream-like products) and beverages cold (below about 15° C. and even below about 0° C. for some food products) for an appropriate time period. The highly insulative food and beverage containers of the present invention have an insulating ability similar to polystyrene, with a K-factor of about 0,035 W/m·K.

By altering the quantities of binder, water, aggregates, fibers, and stabilizing agents, it is possible to control the theology, or flow property, of the hydrated mixture. For example, in the case of ram-pressing or roller casting it is important to start with a relatively highly viscous hydrated mixture which is form stable in the green state so that it can maintain its shape after being formed, even before being fully cured.

On the other hand, in the case of extrusion, pull-trusion, or hot pressing, the hydrated mixture is preferably nonviscous and able to flow. Because containers formed by these methods solidify within a mold, it is not necessary that these hydrated mixtures become form stable as quickly as in other types of processing. Nevertheless, even these less viscous hydrated mixtures must be able to become form stable very rapidly after being placed in the mold in order for the process to be economical. Generally, the longer the product remains in the mold, the higher the cost of manufacturing. As discussed elsewhere, this is one reason why heat or gas-generating materials might be added to the hydrated mixture.

Nevertheless, whether a viscous or nonviscous hydrated mixture is used, it is desirable to use a minimum amount of water. This is because it is important to control the capillary action of the water in the hydrated mixture, which might cause excessive stickiness of the hydrated mixture, which in turn can cause problems in demolding the hydrated mixture from the mold. Hence, the capillary action of the water has to be modified in order for there to be quick release of the hydrated mixture during the molding process. Hence, the amount of water is kept to a minimum in order to limit the free water so that there is not further chemical or mechanical adherence to the mold.

Furthermore, the resulting food and beverage containers are stronger, if less water is used, rather than an excess. Of course, the more water which is used, the more water that must then be removed from the hydrated mixture during the curing process.

1. The "Molding" Process.

During the mixing of the hydrated mixture, it is important to obtain flocculation or gelation of the mixture. For purposes of simplicity, the term "molding," as used in this specification and the appended claims, is intended to include the variety of molding, casting, and extrusion processes discussed herein or well known in the art with respect to materials such as clays, ceramics, and plastics, as well as the process of releasing (or "demolding") the aggregate material from the mold. The term "step of molding" also includes additional processes that might occur while the hydrated mixture is in the mold, e.g., heating the hydrated mixture, the reaction of the alkaline additive with aluminum metal to release gas bubbles for incorporation into the hydrated mixture, and the expansion of the volume of the hydrated mixture in the mold.

In order for the hydrated mixtures of the present invention to be effectively molded, it is important that the composition be form stable in the green state; that is to say, the molded product must rapidly (preferably in three seconds or less) be able to support its own weight. Further, it must harden sufficiently that it can be quickly ejected from the mold; otherwise, the cost of molding may make the process uneconomical. In addition, the surface of the molded article cannot be too sticky, as that would make the demolding process impossible and make it difficult to handle and stack the molded articles.

In addition, there are several modifications to conventional molding processes which are preferably employed in order to ease the manufacturing process. For example, it is frequently desirable to treat the mold with a releasing agent in order to prevent sticking. Suitable release agents include silicon oil, Teflon®, Deleron®, and UHW®. Preferably, the mold itself will be made of steel or of a material with a very "slick" finish, such as Teflon® or Deleron®. If the mold is steel, it will preferably be coated with either nickel or chromium.

The same effect can be achieved from the use of frictional forces. By spinning the head of the molding apparatus against the interior and/or exterior surfaces of the hydrated material, any chemical and mechanical adherence (i.e., stickiness) to the mold can be overcome.

In the process of molding and/or curing the hydrated mixture, it is often desirable to heat up the hydrated mixture in order to control the air void system by allowing for proper control of the porosity and the volume in the container. However, this heating process also aids in making the hydrated mixture form stable in the green state (immediately after molding) by allowing the surface to gain strength quickly. Of course, this heating also aids in rapidly removing significant amounts of the water from the hydrated mixture. The result of these advantages is that the use of the heating process can ease the manufacturing of the food and beverage containers of the present invention.

If a gas has been incorporated into the hydrated mixture, heating that mixture to 250° C. will result (according to the gas-volume equation) in the gas increasing its volume by about 78%. When heating is appropriate, it is preferable for that heating to be in the range from about 100° C. to about 250° C. Importantly, when controlled, this heating will not result in cracks in the structural matrix of the container, or imperfections in the surface texture of the container.

In fact, the process of adding gas bubbles to the hydrated mixture during the molding process can help the molded product to quickly gain stability. From the foregoing disclosure, it will be apparent that this can be accomplished by the addition of a strong base, along with an easily oxidized metal such as aluminum or zinc, and that the gas generating process can be accelerated with the addition of heat.

2. The Curing Process.

The compositions of the present invention must also rapidly gain sufficient strength for use as a container shortly after formation. This is essential so that the molded product can be quickly removed from the mold, further processed as necessary, stacked, and packaged. While no significant processing condition is necessarily modified for curing products within the scope of the present invention, many of the features discussed above (e.g., inter alia, controlling the capillary action of water, the introduction of aid voids throughout the hydrated mixture, and the use of heat) are important for the products of the present invention to quickly achieve strength while in the green state and properly cure.

III. Examples of the Preferred Embodiments.

To date, numerous tests have been performed comparing the properties of food and beverage containers of varying composition. Below are specific examples of compositions containing aggregates held together using appropriate environmentally compatible binders which have been created according to the present invention.

EXAMPLE 1

A cup was formed by ram pressing a hydrated mixture containing the following components:

| | |
|---|---|
| Tylose® 15002 | 0.2 kg |
| Water | 2.3 kg |
| Hollow glass spheres | 0.905 kg |

The hydrated mixture was made by first mixing together the water and Tylose® for five minutes, and then mixing in the hollow glass spheres until the hydrated mixture became homogeneous and plastic-like, which took about five minutes. Fine hollow glass spheres were used in this example, wherein the size of the individual glass spheres was less than 40 microns.

The cup had a wall thickness of 2.5 mm. The K-factor was found to be 0.035 W/m·K, which is similar to that of polystyrene.

Although the cup was able to hold together to some degree, it did not appear to have enough strength to withstand forces associated with how a cup or container might be treated when dispensing and storing fast foods.

EXAMPLE 2

A cup was formed using the same composition and method as in Example 1, except that 0.04 kg of abaca fiber was added to the mixture. First, the abaca fiber was mixed with the water for five minutes in order to begin the dispersion of the fibers. After the Tylose® was added, which imparted shear into the mixture, the fibers were completely dispersed. In all other respects, the cup was formed in the same manner and had a K-factor of 0.035. The cured structural matrix within the cup was found to have a compressive strength of 1 MPa and a tensile strength of 0.8 MPa, indicating that the material is sufficiently strong and durable for use as a food or beverage container in a variety of uses and contexts.

The cup of Example 2 was tested by adding water having a temperature of 88° C. The temperature on the outer surface of the cup never exceeded 52° C.

EXAMPLES 3–6

Cups were formed according to the method of Example 1, except that abaca fiber was added in varying amounts to the mixtures of the respective examples as follows:

| Example | Abaca Fiber Added |
| --- | --- |
| 3 | 0.08 kg |
| 4 | 0.13 kg |
| 5 | 0.17 kg |
| 6 | 0.21 kg |

The hydrated mixtures of Examples 3–6 were formed according to the method of Example 2. The cups were similar to the cups formed in Example 2. However, as more fiber was added, the compressive and tensile strengths increased, although not in direct relation to the increased amount of the added abaca fiber. Thus, although the amount of abaca fiber was increased two-fold in Example 3 as compared to Example, the strength did not double, although it did increase by a significant amount.

In addition, as more fiber was added, the K-factor increased very slightly.

EXAMPLES 7–12

Examples 1–6 were repeated in every respect except that three different sizes of hollow glass spheres were used in order to optimize the amount of particle packing of the hollow glass spheres: fine (0.398 kg), medium (0.338 kg), and course (0.422 kg). Although the overall mass of the hollow glass spheres in Examples 7–12 (1.158 kg) was greater than in Examples 1–6 (0.905 kg), their volume was about the same.

The cups made according to Examples 7–12 had slightly lower K-factors, higher strengths, and smoother surfaces than the cups of Examples 1–6.

EXAMPLES 13–24

The hydrated materials that were made according to Examples 1–12 were alternatively extruded into bars measuring ½ in$^2$ and allowed to harden. Therefore, each of the materials used in Examples 13–24 corresponds to the materials previously used in Examples 1–12, respectively.

The bars formed according to each of Examples 13–24 had similar strengths in the green state, although the cured bars that had abaca fiber had greater strength and durability than those without abaca fiber. In addition, as the amount of abaca fiber was increased, the strengths of the bars made therefrom increased somewhat. Although bars have no readily apparent use in the packaging and portioning of food and beverages, they were made to demonstrate that the materials of the present invention can be formed into a variety of shapes and still maintain their form. The ½ in$^2$ bars are essentially straight and rectangular although formed by extrusion, not molding. Nevertheless, because the extruded materials had sufficient strength in the green state they were able to maintain their form during the curing process.

EXAMPLE 25

A cup was formed by roller casting an extruded hydrated mixture containing the following components:

| | |
| --- | --- |
| Hollow glass spheres (fine) | 0.278 kg |
| Hollow glass spheres (medium) | 0.236 kg |
| Hollow glass spheres (course) | 0.295 kg |
| Vermiculite | 0.543 kg |
| Perlite | 0.211 kg |
| Tylose ® | 0.200 kg |
| Water | 2.3 kg |

The hydrated mixture was made by first mixing together the water and Tylose® for five minutes, and then mixing in the hollow glass spheres, vermiculite, and perlite until the hydrated mixture became homogeneous and plastic-like, which took about five minutes. Three different sizes of hollow glass spheres were used to optimize the amount of particle packing.

The cup had a wall thickness of 2.5 mm. The K-factor was found to be 0.045 W/m·K, which is comparable to that of polystyrene.

Although the cup was able to hold together to some degree, it did not appear to have enough strength to withstand forces associated with how a cup or container might be treated when dispensing and storing fast foods.

EXAMPLES 26–30

Cups were made according to the composition and method of Example 25, except that varying amounts of abaca fiber were added as a percentage of volume as follows:

| Example | Abaca Fiber Added |
| --- | --- |
| 26 | 1% |
| 27 | 2% |
| 28 | 3% |
| 29 | 4% |
| 30 | 5% |

The hydrated mixture was formed similar to the method of Example 25, except that the abaca fiber was first mixed with the water alone to begin the dispersion of the individual fibers. After the addition of Tylose®, which added shear to the mixture, the fibers were completely dispersed. The cups of each of these examples were similar to the cup of Example 13, except that the strength of the cups increased as more abaca fiber was added to the hydrated mixture. For example, the cup that was made according to Example 26 had a compressive strength of 0.9 MPA and a tensile strength of 0.7 MPa. Each of the cups had a K-factor of 0.045.

From these examples, it can be seen that by adding vermiculite and perlite the overall strength and toughness of the cup, as well as the insulating ability, were decreased somewhat. The decrease in strength and toughness is believed to be the result of the inclusion of perlite. However, in those applications where cost rather than strength or insulating ability is the overriding concern, perlite might be a preferred ingredient due to its lower cost relative to hollow glass spheres.

EXAMPLES 31–33

Cups were formed by roller casting extruded hydrated mixtures containing the following components measured in kilograms:

| Example | Hollow Glass Spheres | Clay | Tylose ® | Water |
|---------|----------------------|------|----------|-------|
| 31 | 0 | 10.0 | 0.100 | 0.200 |
| 32 | 0.5 | 5.0 | 0.100 | 1.000 |
| 33 | 1.0 | 1.0 | 0.100 | 1.500 |

The hydrated mixtures were made by mixing together the clay, water, and Tylose® for five minutes. Thereafter, in Examples 32 and 33, the hollow glass spheres were mixed into the hydrated mixture for about five minutes until the mixture became fairly homogeneous. In order to optimize the amount of particle packing in order to reduce interstitial space, increase overall strength, and obtain a smoother finish of the final product, three different sizes of hollow glass spheres (fine, medium, and course) were used in approximately equal amounts.

The cups each had a wall thickness of 2.5 mm. The lightness and insulating ability of the cups is greatly increased depending on the amount of hollow glass spheres that were added to the mixture. However, the containers containing greater amounts of clay had greater strength, which is believed to be due to the added binding effect of including greater amounts of clay. Nevertheless, none of the cups had the same strength characteristics as the cups formed in previous examples containing abaca fiber.

Moreover, none of the cups of Examples 31–33 had the insulation properties of the cups of Examples 1–30. Nevertheless, where cost not insulation is the overriding concern, clay might be the ingredient of choice due to its extremely low cost compared to hollow glass spheres or other aggregates.

EXAMPLES 34–38

Cups were made using the same compositions and methods as those of Example 31, except that the following amounts of abaca fiber were added to the hydrated mixtures as measured as a percentage of volume.

| Example | Abaca Fiber Added |
|---------|-------------------|
| 34 | 1% |
| 35 | 2% |
| 36 | 3% |
| 37 | 4% |
| 38 | 5% |

The hydrated mixtures of Examples 34–38 were formed as in Example 31, except that the abaca fiber was first mixed with the water to begin the dispersion of the fibers. The cups had similar insulating characteristics as the cup of Example 31, except that the strengths of the cups of Examples 34–38 increased in relation to the amount of abaca fiber that was added.

EXAMPLES 39–43

Cups were made using the same compositions and methods as those of Example 32, except that the following amounts of abaca fiber were added to the hydrated mixtures as measured as a percentage of volume.

| Example | Abaca Fiber Added |
|---------|-------------------|
| 39 | 1% |
| 40 | 2% |
| 41 | 3% |
| 42 | 4% |
| 43 | 5% |

The hydrated mixtures of Examples 39–43 were formed as in Example 32, except that the abaca fiber was first mixed with the water to begin the dispersion of the fibers. The cups had similar insulating characteristics as the cup of Example 32, except that the strengths of the cups of Examples 39–43 increased in relation to the amount of abaca fiber that was added.

EXAMPLES 44–48

Cups were made using the same compositions and methods as those of Example 33, except that the following amounts of abaca fiber were added to the hydrated mixtures as measured as a percentage of volume.

| Example | Abaca Fiber Added |
|---------|-------------------|
| 44 | 1% |
| 45 | 2% |
| 46 | 3% |
| 47 | 4% |
| 48 | 5% |

The hydrated mixtures of Examples 44–48 were formed as in Example 33, except that the abaca fiber was first mixed with the water to begin the dispersion of the fibers. The cups had similar insulating characteristics as the cup of Example 33, except that the strengths of the cups of Examples 44–48 increased in relation to the amount of abaca fiber that was added.

EXAMPLE 49

A cup was formed using the same composition and method as the cup of Example 48, except that 50 g of polyethylene glycol (having a molecular weight of 20,000 or higher) was added to the hydrated mixture prior to being formed into a cup. The cup had properties that were similar to the cup of Example 48, except that it had a smoother surface.

EXAMPLE 50

A plate was formed by molding a hydrated mixture having the following components:

| | |
|---|---|
| Tylose ® | 0.20 kg |
| Water | 2.30 kg |
| Plastic Balls | 0.12 kg |

The hydrated mixture was formed by mixing together the Tylose® and water for five minutes after which the plastic balls were added to the hydrated mixture, which was mixed an additional five minutes. The plastic balls were extremely lightweight, having a density that is lower than the density of the hollow glass spheres used in the examples above.

The plate that was formed in this example had lower strength but superior insulation properties, with the K-factor being 0.03 W/m·K. However, the plate had a much higher degree of elasticity relative to the materials that were formed in the previous examples. An elastic product may be preferred in certain food and beverage storage and dispensing applications.

EXAMPLES 51–55

Plates were formed using the composition and method of Example 50, except that varying amounts of abaca fiber were added to the hydrated mixtures as follows:

| Example | Abaca Fiber Added |
|---|---|
| 51 | 0.04 kg |
| 52 | 0.08 kg |
| 53 | 0.13 kg |
| 54 | 0.17 kg |
| 55 | 0.21 kg |

The hydrated mixtures were formed according to the method of Example 50, except that the abaca fiber was first mixed with the water in order to begin the dispersion of the fibers. As the amount of abaca fiber was increased, the strengths of the plates formed therefrom also increased.

Although the plates formed using the compositions of Examples 50–55 actually had superior insulation compared to cups formed without plastic balls, these compositions may not be preferred because the plastic balls are not as environmentally benign as the other aggregate materials used in other examples. Nevertheless, the amount of plastic balls relative to the mass of the overall mixture is low (4.5%).

EXAMPLES 56–61

The compositions of Examples 50–55 were extruded into bars measuring ½ in$^2$ and allowed to cure. Therefore, each of the materials used in Examples 56–61 corresponds to the materials used in Examples 50–55, respectively. The bars formed according to each of Example 56–61 had similar strengths in the green state, although the cured bars having greater amounts of abaca fiber had correspondingly greater strengths and durabilities.

Although bars have no readily apparent use in the packaging and portioning of food and beverages, they were made to demonstrate that the materials of the present invention can be formed into a variety of shapes and still maintain their form. The ½ in$^2$ bars are essentially straight and rectangular although formed by extrusion, not molding. Nevertheless, because the extruded materials had sufficient strength in the green state they were able to maintain their form during the curing process.

In addition, each of the bars in these examples was thereafter cut into chips in order to obtain an elastic cushioning material similar in weight and cushioning ability to styrofoam peanuts. However, the chips formed in these examples were far more durable and were able to withstand far more weight. Moreover, they do not pose the environmental dangers of polystyrene as set forth in the background section. Although the cushioning chips of these examples contain plastic, the amount of plastic as a percentage of the overall mass of the product is relatively low (about 4.5%), particularly compared with polystyrene peanuts, which are essentially 100% polystyrene.

EXAMPLE 62

A cup was formed by ram pressing a hydrated mixture containing the following components:

| | |
|---|---|
| Tylose ® | 0.200 kg |
| Water | 20 kg |
| Abaca fibers | 0.500 kg |
| Mearlcrete ® | 0.500 kg |
| Hollow glass spheres | 1.0 kg |

The hydrated mixture was formed by mixing together the water, fibers, and Mearlcrete for five minutes using a high speed mixer to disperse the fibers and to introduce entrained air into the mixture. The foamed mixture was then stabilized by adding Tylose®, and mixed for an additional five minutes. Finally, 3 Kg of the foam mixture was added to the hollow glass spheres and mixed an additional five minutes in a low shear mixture.

The resulting hydrated mixture contained a significant amount of tiny, nonagglomerated air voids. The resulting cups that were made therefrom had a slightly lower K-factor than cups in which air was not entrained into the hydrated mixture, although the strength decreased as well.

While the following examples are hypothetical in nature, they are based upon similar mix designs which have either been made, or which were calculated and extrapolated from actual mixes. However, these examples are presented this way in order to more specifically teach those skilled in the art the compositions and methods of the present invention.

EXAMPLES 63–68

Hydrated mixtures are formed using the same composition as in Examples 1–6, except that the amount of water is reduced to 1.7 kg. The resulting hydrated mixtures of Examples 63–68 have decreased plasticity and greatly increased viscosity. They are therefore more suited for molding processes which require highly viscous starting materials with a stiffer rheology such as ram pressing. However, the cups formed using these hydrated mixtures have similar insulation and strength properties as those of Examples 1–6.

EXAMPLES 69–74

Hydrated mixtures are formed using the same composition as in Examples 1–6, except that the amount of water is increased to 3.0 kg. The resulting hydrated mixtures of Examples 69–74 have increased plasticity and significantly lower viscosity. They are therefore more suited for molding processes which require starting materials with lower viscosities, such as injection molding.

In order to increase the rate of curing and/or to decrease the density of the hydrated mixture in order to make a cup with a higher ability to insulate, heat is applied to the mold. The rate of water vaporization increases as the temperature is increased. As the density of the final product decreases, the insulating ability increases, although the strength properties decrease somewhat.

EXAMPLES 75–80

Hydrated mixtures are formed using the same compositions as in Examples 1–6, except that NaOH is added in an amount of 21.9 g and fine mesh Aluminum powder is added in an amount of 4.2 g.

The resulting hydrated mixtures contain a significant amount of entrained nonagglomerated air voids caused by the reduction of hydrogen ions within the aqueous solution to hydrogen gas during the oxidation of the aluminum metal. The hydrated mixtures can be mixed for a longer period of time during the formation of hydrogen gas bubbles, or they can be molded immediately and then heated to increase the rate of hydrogen gas formation. If the latter method is used, the hydrated mixture will expand while in the mold, which increases the ease of the subsequent demolding process. In addition, depending on how much heat is applied to the mold, a certain amount of water will vaporize, which further adds air voids to the molded material and which decreases the density of the resulting product.

EXAMPLES 81–86

Hydrated mixtures are formed according to the compositions and methods of Example 75–80, respectively, except that NaOH is added in an amount of 34.7 g and fine mesh Aluminum powder is added in an amount of 6.3 g. Both the rate of formation and the volume of hydrogen gas is increased in comparison to Examples 75–80. In most other respects, the cups formed in Examples 81–86 are similar in strength and insulation ability to the cups of Examples 75–80, respectively.

EXAMPLES 87–92

Hydrated mixtures are formed according to the compositions and methods of Examples 81–86, respectively, except that NaOH is added in an amount of 34.7 g and fine mesh Aluminum powder is added in an amount of 8.4 g. Both the rate of formation and the volume of hydrogen gas is increased in comparison to Examples 81–86. In most other respects, the cups formed in Examples 87–92 are similar in strength and insulation ability to the cups of Examples 81–86, respectively.

EXAMPLES 93–111

Cups are manufactured according to the compositions and methods of Examples 31–49, respectively, except that clay is replaced with an equal amount of gypsum. The cups that are formed in Examples 93–111 have insulation properties similar to those of the cups of Examples 31–49, respectively, except that the cups that contain gypsum have slightly higher strength characteristics. This is due to the fact that gypsum is a slightly better binder than clay.

Like the cups that contain clay, the main utility of the cups containing gypsum are their extremely low cost due to the low cost of gypsum.

EXAMPLES 112–117

In each of the following examples cups are manufactured according to the composition and method of Example 2, except that Tylose® is replaced with an equal amount of each of the following cellulose based binders, respectively:

| Example | Binder |
|---------|--------|
| 112 | hydroxymethylethylcellulose |
| 113 | carboxymethylcellulose |
| 114 | methylcellulose |
| 115 | ethylcellulose |
| 116 | hydroxyethylcellulose |
| 117 | hydroxypropylcellulose |

Cups made using each of these cellulose based binders have properties that are similar or identical to the cup of Example 2, including good strength, high insulation, and low environmental impact. To the extent that a particular binder is more water soluble than Tylose® (methylhydroxyethylcellulose), the cup made therefrom will degrade faster when exposed to moisture. Conversely, a cup made with a binder that is less water soluble will degrade more slowly when exposed to moisture. Hence, by changing the concentration or type of the binder, the water solubility of the resultant product can be controlled and regulated.

EXAMPLE 118

Cups are manufactured according to the composition and method of Example 2, except that, in addition to the Tylose® materials indicated, Tylose MHB 30,000 p is added in a concentration of 0.25 volume percent of the total mixture volume.

Cups made using this composition are similar to the cup of Example 2 with respect to high insulation and low environmental impact; however, the cups have higher strength and lower water absorption. Hence, by controlling the type and concentration of the Tylose®, the water solubility (and thus the absorption of water into the matrix) of the resultant product can be controlled and regulated.

EXAMPLES 119–129

In each of the following examples cups are manufactured according to the composition and method of Example 2, except that Tylose® is replaced with an equal amount of each of the following starch based binders, respectively:

| Example | Binder |
|---------|--------|
| 119 | amylopectin |
| 120 | amylose |
| 121 | sea-gel |
| 122 | starch acetate |
| 123 | starch hydroxyethyl ether |
| 124 | ionic starch |
| 125 | long-chain alkyl starch |
| 126 | dextrin |
| 127 | amine starch |
| 128 | phosphate starch |
| 129 | dialdehyde starch |

Cups made using each of these starch based binders have properties that are similar or identical to the cup of Example 2, including good strength, high insulation, and low environmental impact. To the extent that a particular binder is more water soluble than Tylose®, the cup made therefrom will degrade faster when exposed to moisture. Conversely, a cup made with a binder that is less water soluble will degrade more slowly when exposed to moisture.

EXAMPLES 130–137

In each of the following examples cups are manufactured according to the composition and method of Example 2, except that Tylose® is replaced with an equal amount of each of the following polysaccharide binders, respectively:

| Example | Binder |
| --- | --- |
| 130 | alginic acid |
| 131 | phycocolloid |
| 132 | agar |
| 133 | gum arabic |
| 134 | guar gum |
| 135 | locust bean gum |
| 136 | gum karaya |
| 137 | gum tragacanth |

Cups made using each of these polysaccharide binders have properties that are similar or identical to the cup of Example 2, including good strength, high insulation, and low environmental impact. To the extent that a particular binder is more water soluble than Tylose®, the cup made therefrom will degrade faster when exposed to moisture. Conversely, a cup made with a binder that is less water soluble will degrade more slowly when exposed to moisture.

EXAMPLES 138–142

In each of the following examples cups are manufactured according to the composition and method of Example 2, except that Tylose® is replaced with an equal amount of each of the following protein based binders, respectively:

| Example | Binder |
| --- | --- |
| 138 | Zein ® |
| 139 | gelatin |
| 140 | glue |
| 141 | casein |
| 142 | collagen derivatives |

Cups made using each of these protein based binders have properties that are similar or identical to the cup of Example 2, including good strength, high insulation, and low environmental impact. To the extent that a particular binder is more water soluble than Tylose®, the cup made therefrom will degrade faster when exposed to moisture. Conversely, a cup made with a binder that is less water soluble will degrade more slowly when exposed to moisture.

EXAMPLES 143–151

In each of the following examples cups are manufactured according to the composition and method of Example 2, except that Tylose® is replaced with an equal amount of each of the following synthetic organic binders, respectively:

| Example | Binder |
| --- | --- |
| 143 | polyvinyl pyrrolidone |
| 144 | polyvinyl alcohol |
| 145 | polyvinylmethyl ether |
| 146 | polyacrylic acid |
| 147 | polyvinylacrylic acid |
| 148 | sodium polyacrylate |
| 149 | sodium polyvinylacrylate |
| 150 | polyacrylamide |
| 151 | ethylene oxide polymer |

Cups made using each of these synthetic organic binders have properties that are comparable to the cup of Example 2, including good strength, high insulation, and low environmental impact. To the extent that a particular binder is more water soluble than Tylose®, the cup made therefrom will degrade faster when exposed to moisture. Conversely, a cup made with a binder that is less water soluble will degrade more slowly when exposed to moisture. (It will be appreciated that many of these synthetic organic binders are not environmentally benign; however, in the concentrations that are incorporated into the final products, the impact upon the environment is much less than that of the prior art compositions and products.)

EXAMPLE 152

Cups are manufactured using the composition and method of Example 2, except that Tylose® is replaced with an equal amount of a latex binder. Cups made using a latex binder have properties that are similar or identical to the cup of Example 2, including good strength, high insulation, and low environmental impact. Because latex is less water soluble than Tylose®, a cup made therefrom will degrade more slowly when exposed to moisture than a cup made with Tylose®. (As in the products of Examples 143–151, the latex binder has certain environmental problems, but they are significantly less than prior art compositions and products.)

EXAMPLE 153

Cups are manufactured using the composition and method of Example 2, except that abaca fibers are replaced with an equal amount of glass fibers. Cups made using glass fibers have properties that are similar or identical to the cup of Example 2, including good strength, high insulation, and low environmental impact. However, because glass fibers are less resistant to strong aqueous bases than abaca fibers, in those embodiments in which a strong base and an easily oxidized metal is used, the glass fibers should be pretreated to make them more resistant to alkaline conditions.

EXAMPLES 154–161

Cups are manufactured using the composition and method of Example 2, except that the hollow glass spheres are replaced with an equal amount of each of the following lightweight aggregate materials, respectively:

| Example | Aggregate |
| --- | --- |
| 154 | aerogel |
| 155 | exfoliated rock |
| 156 | lightweight concrete |
| 157 | lightweight expanded clay |
| 158 | expanded fly ash |
| 159 | expanded slag |
| 160 | pumice |
| 161 | porous ceramic spheres |
| 162 | tabular alumina |
| 163 | cork |

Cups made according to these examples have varying degrees of strength, durability, and insulating ability relative to the cups of Example 2. Those aggregates in which efficient particle packing is possible will yield cups that have properties more similar to the cups of Example 2. Those aggregates that contain larger amounts of interstitial air will generally yield cups that have a greater insulating ability.

EXAMPLES 164–173

Cups are manufactured using the composition and method of Example 31, except that clay is replaced with an equal amount of each of the following aggregate materials, respectively:

| Example | Aggregate |
|---|---|
| 164 | sand |
| 165 | gravel |
| 166 | rock |
| 167 | limestone |
| 168 | calcium carbonate |
| 169 | concrete |
| 170 | sandstone |
| 171 | alumina |
| 172 | microsilica |
| 173 | calcium aluminate |

Cups made according to these examples have varying degrees of strength, durability, and insulating ability relative to the cups of Example 31. Those aggregates in which efficient particle packing is possible will yield cups that have properties more similar to the cups made with clay. The major concern for cups made with these aggregates is low cost and high strength, not insulating ability or lightweight.

EXAMPLES 174–178

Cups are manufactured using the composition and method of Example 25, except that perlite and vermiculite are replaced with an equal amount of each of the following aggregate materials, respectively:

| 174 | metal filings |
|---|---|
| 175 | seeds |
| 176 | starch granules |
| 177 | solid agar-type materials |
| 178 | solid gelatins |

Cups made according to these examples have varying degrees of strength, durability, and insulating ability relative to the cups of Example 31. Those aggregates in which efficient particle packing is possible will yield cups that have properties more similar to the cups of Example 25. In general, the cups made with these aggregates are lightweight, highly insulative (with a K-factor of approximately 0.045 W/m·K), strong, and environmentally benign. (Of course, the cups of Example 174 which incorporate metal filings are not as insulative, because the metal has a high K-factor and is heat conductive)

IV. Summary.

From the foregoing, it will be appreciated that the present invention provides novel compositions and processes for manufacturing containers for the storage, dispensing, packaging, and portioning of food and beverages.

The present invention also provides novel compositions and processes for making food and beverage containers which have insulating and other properties comparable to that of cups and containers made from polystyrene foam, but which are more environmentally neutral. Specifically, the present invention does not require the use of, or emit, chemicals which have been implicated as causing depletion of the ozone layer, nor does it create unsightly garbage which does not degrade, or very slowly degrades, over time in landfills.

In addition, the present invention also provides novel compositions and processes for food and beverage containers that can be produced at relatively low cost.

Further, the present invention provides novel compositions and processes for manufacturing food and beverage containers which are flexible and disposable, but which are much more environmentally sound in their disposal than other disposable containers, such as those made from paper, plastic and styrofoam. The present invention provides novel compositions and processes for food and beverage containers which are essentially comprised of the same compounds as the earth, and are similar to dirt and rock, and therefore pose little or no risk to the environment when discarded.

The present invention further provides novel compositions and processes for which the raw materials may be obtained from the earth, eliminating the need to cut down large numbers of trees in order to create the starting raw materials, as is required for the manufacture of paper containers.

The present invention further provides novel compositions and processes for improving the safety of storage and dispensing containers, in that the containers do not release harmful chemicals like dioxin into the foodstuffs therein, nor is dioxin produced during the manufacture of such containers.

The present invention further provides novel compositions and processes for improving the recyclability of disposable containers, particularly since the bound aggregate materials can be reintroduced into new containers as an aggregate or can be reformed simply by rehydrating and remixing the waste materials.

The present invention further provides novel compositions and processes for achieving lightweight containers which still give sufficient structural support for the food or beverage product.

The present invention further provides novel food and beverage containers which will maintain their shape without external support during the green state, and which will rapidly achieve sufficient strength so that the molded containers can be handled under ordinary manufacturing conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture for storing, dispensing, packaging, or portioning food or beverage products comprising a container having a matrix reinforced with fibers, the matrix comprising a substantially homogeneous mixture of aggregate and organic binder, the matrix of the container formed by removing a substantial quantity of water by evaporation from a hydrated mixture comprising an organic binder selected from the group consisting of polysaccharides, proteins, and mixtures or derivatives thereof, water, fibers, and an inorganic aggregate material, the aggregate material having a concentration in a range from about 40% to about 95% by weight of solids in the hydrated mixture, wherein the fiber-reinforced matrix of aggregate and organic binder of the container for storing, dispensing, packaging, or portioning food or beverage products has a density less than about 1.5 g/cm$^3$ and a thickness less than about 3 mm and degrades after prolonged exposure to water, and wherein the fibers are substantially homogeneously dispersed throughout the matrix of aggregate and organic binder.

2. An article of manufacture for storing, dispensing, packaging, or portioning food or beverage products as defined in claim 1, wherein the matrix has a strength to bulk density ratio in a range from about 0.5 MPa·cm$^3$/g to about 10 MPa·cm$^3$/g.

3. An article of manufacture for storing, dispensing, packaging, or portioning food or beverage products as defined in claim 1, wherein the matrix has a strength to bulk density ratio in a range from about 1 MPa·cm$^3$/g to about 8 MPa·cm$^3$/g.

4. An article of manufacture for storing, dispensing, packaging, or portioning food or beverage products as defined in claim 1, wherein the matrix has a strength to bulk density ratio in a range from about 2 MPa·cm$^3$/g to about 5 MPa·cm$^3$/g.

5. An article of manufacture for storing, dispensing, packaging, or portioning food or beverage products as defined in claim 1, wherein the polysaccharide comprises a cellulose-based material.

6. An article of manufacture for storing, dispensing, packaging, or portioning food or beverage products as defined in claim 5, wherein the cellulose-based material is selected from the group consisting of hydroxymethylethylcellulose, methylcellulose, hydroxyethylcellulose, ethylcellulose, hydroxyethylpropylcellulose, and mixtures or derivatives thereof.

7. An article of manufacture for storing, dispensing, packaging, or portioning food or beverage products as defined in claim 5, wherein the cellulose-based material comprises methylhydroxyethylcellulose.

8. An article of manufacture for storing, dispensing, packaging, or portioning food or beverage products as defined in claim 7, wherein a 2% solution of the methylhydroxyethylcellulose in water has a viscosity in a range from about 4,000 cps to about 30,000 cps measured at 20° C.

9. An article of manufacture for storing, dispensing, packaging, or portioning food or beverage products as defined in claim 5, wherein the cellulose-based material comprises carboxymethylcellulose.

10. An article of manufacture for storing, dispensing, packaging, or portioning food or beverage products as defined in claim 1, wherein the polysaccharide comprises a starch-based material.

11. An article of manufacture for storing, dispensing, packaging, or portioning food or beverage products as defined in claim 10, wherein the starch-based material is selected from the group consisting of starch acetates, starch hydroxyethyl ethers, ionic starches, long-chain alkyl starches, dextrins, amine starches, phosphate starches, dialdehyde starches, and mixtures or derivatives thereof.

12. An article of manufacture for storing, dispensing, packaging, or portioning food or beverage products as defined in claim 10, wherein the starch-based material comprises amylopectin or a derivative thereof.

13. An article of manufacture for storing, dispensing, packaging, or portioning food or beverage products as defined in claim 10, wherein the starch-based material comprises amylose or a derivative thereof.

14. An article of manufacture for storing, dispensing, packaging, or portioning food or beverage products as defined in claim 10, wherein the starch-based material comprises sea gel or a derivative thereof.

15. An article of manufacture for storing, dispensing, packaging, or portioning food or beverage products as defined in claim 1, wherein the polysaccharide is selected from the group consisting of alginic acid, phycocolloids, agar, gum arabic, guar gum, locust bean gum, gum karaya, gum tragacanth, and mixtures or derivatives thereof.

16. An article of manufacture for storing, dispensing, packaging, or portioning food or beverage products as defined in claim 1, wherein the organic binder comprises a protein-based material.

17. An article of manufacture for storing, dispensing, packaging, or portioning food or beverage products as defined in claim 1, wherein the protein is selected from the group consisting of gelatin, glue, casein, and mixtures or derivatives thereof.

18. An article of manufacture for storing, dispensing, packaging, or portioning food or beverage products as defined in claim 1, wherein the protein comprises a prolamine.

19. An article of manufacture for storing, dispensing, packaging, or portioning food or beverage products as defined in claim 1, wherein the water within the hydrated mixture has a concentration in a range from about 10% to about 80% by volume of the hydrated mixture before any of the water has been removed.

20. An article of manufacture for storing, dispensing, packaging, or portioning food or beverage products as defined in claim 1, wherein the aggregate material comprises a lightweight aggregate selected from the group consisting of perlite, vermiculite, exfoliated rock, pumice, lightweight concrete, expanded clay, expanded fly ash, expanded slag, and mixtures or derivatives thereof.

21. An article of manufacture for storing, dispensing, packaging, or portioning food or beverage products as defined in claim 1, wherein the aggregate material comprises hollow glass spheres.

22. An article of manufacture for storing, dispensing, packaging, or portioning food or beverage products as defined in claim 1, wherein the aggregate material comprises aerogel.

23. An article of manufacture for storing, dispensing, packaging, or portioning food or beverage products as defined in claim 1, wherein the aggregate material comprises an elastomeric material which imparts flexibility to the matrix of the article of manufacture.

24. An article of manufacture for storing, dispensing, packaging, or portioning food or beverage products as defined in claim 1, wherein the matrix further includes plastic spheres.

25. An article of manufacture for storing, dispensing, packaging, or portioning food or beverage products as defined in claim 1, wherein the aggregate material comprises a naturally occurring rock which has been treated to create air voids and to increase its volume to mass ratio.

26. An article of manufacture for storing, dispensing, packaging, or portioning food or beverage products as defined in claim 1, wherein the aggregate material is selected from the group consisting of calcium carbonate, sand, gravel, limestone, sandstone, concrete, ceramic, alumina, and mixtures or derivatives thereof.

27. An article of manufacture for storing, dispensing, packaging, or portioning food or beverage products as defined in claim 1, wherein the aggregate material comprises clay.

28. An article of manufacture for storing, dispensing, packaging, or portioning food or beverage products as defined in claim 27, wherein the matrix comprises a sufficient amount of clay such that the clay imparts a binding force within the matrix.

29. An article of manufacture for storing, dispensing, packaging, or portioning food or beverage products as defined in claim 1, wherein the aggregate material comprises gypsum.

30. An article of manufacture for storing, dispensing, packaging, or portioning food or beverage products as defined in claim 29, where the matrix comprises a sufficient amount of gypsum such that the gypsum imparts a binding force within the structural matrix.

31. An article of manufacture for storing, dispensing, packaging, or portioning food or beverage products as defined in claim 1, wherein the matrix has a thickness and wherein the aggregate material includes individual particles having an average diameter in a range from about 1/10 to about 3/4 of the thickness of the structural matrix.

32. An article of manufacture for storing, dispensing, packaging, or portioning food or beverage products as defined in claim 1, wherein the matrix has a thickness and wherein the aggregate material includes individual particles having an average diameter in a range from about 1/10 to about 1/2 of the thickness of the matrix.

33. An article of manufacture for storing, dispensing, packaging, or portioning food or beverage products as defined in claim 1, wherein the matrix has a thickness and wherein the aggregate material includes individual particles having an average diameter of less than approximately 1/4 of the thickness of the matrix.

34. An article of manufacture for storing, dispensing, packaging, or portioning food or beverage products as defined in claim 1, wherein the aggregate material imparts a predetermined color to the matrix.

35. An article of manufacture for storing, dispensing, packaging, or portioning food or beverage products as defined in claim 1, wherein the aggregate material imparts a predetermined texture to the matrix.

36. An article of manufacture for storing, dispensing, packaging, or portioning food or beverage products as defined in claim 1, wherein the matrix further includes an organic aggregate material selected from the group consisting of seeds, starch granules, cork, solid gelatin material, solid agar materials, and mixtures or derivatives thereof.

37. An article of manufacture for storing, dispensing, packaging, or portioning food or beverage products as defined in claim 1, wherein the aggregate material within the hydrated mixture has a concentration in a range from about 40% to about 75% by weight of the hydrated mixture before the water has been removed.

38. An article of manufacture for storing, dispensing, packaging, or portioning food or beverage products as defined in claim 1, wherein the fibers add tensile strength to the matrix.

39. An article of manufacture for storing, dispensing, packaging, or portioning food or beverage products as defined in claim 1, wherein the fibers are selected from the group consisting of glass, rock wool, cellulose, hemp, metal, ceramic, and silica fiber, and mixtures or derivatives thereof.

40. An article of manufacture for storing, dispensing, packaging, or portioning food or beverage products as defined in claim 1, wherein the fibers comprise abaca fibers.

41. An article of manufacture for storing, dispensing, packaging, or portioning food or beverage products as defined in claim 1, wherein the fibers have an aspect ratio of at least 10:1.

42. An article of manufacture for storing, dispensing, packaging, or portioning food or beverage products as defined in claim 1, wherein the fibers have an aspect ratio of at least 100:1.

43. An article of manufacture for storing, dispensing, packaging, or portioning food or beverage products as defined in claim 1, wherein the fibers have an aspect ratio in a range from about 200:1 to about 300:1.

44. An article of manufacture for storing, dispensing, packaging, or portioning food or beverage products as defined in claim 1, wherein the fibers have lengths, wherein the aggregate material includes individual particles having effective diameters, and wherein the lengths of the fibers are at least twice the effective diameter of the individual particles of the aggregate material.

45. An article of manufacture for storing, dispensing, packaging, or portioning food or beverage products as defined in claim 1, wherein the fibers have lengths, wherein the aggregate material includes individual particles having effective diameters, and wherein the lengths of the fibers are at least ten times the effective diameter of the individual particles of the aggregate material.

46. An article of manufacture for storing, dispensing, packaging, or portioning food or beverage products as defined in claim 1, wherein the fibers have lengths, wherein the aggregate material includes individual particles having effective diameters, and wherein the lengths of the fibers are at least 100 times the effective diameter of the individual particles of the aggregate material.

47. An article of manufacture for storing, dispensing, packaging, or portioning food or beverage products as defined in claim 1, wherein the fibers have lengths, wherein the aggregate material includes individual particles having effective diameters, and wherein the lengths of the fibers are at least 1000 times the effective diameter of the individual particles of the aggregate material.

48. An article of manufacture for storing, dispensing, packaging, or portioning food or beverage products as defined in claim 1, wherein the fibers increase the insulative properties of the article of manufacture.

49. An article of manufacture for storing, dispensing, packaging, or portioning food or beverage products as defined in claim 1, wherein the fibers within the hydrated mixture have a concentration of up to about 10% by volume of the hydrated mixture before the water has been removed.

50. An article of manufacture for storing, dispensing, packaging, or portioning food or beverage products as defined in claim 1, wherein the fibers within the hydrated mixture have a concentration in a range from about 0.5% to about 10% by volume of the hydrated mixture before the water has been removed.

51. An article of manufacture for storing, dispensing, packaging, or portioning food or beverage products as defined in claim 1, wherein the fibers within the hydrated mixture have a concentration in a range from about 1% to about 6% by volume of the hydrated mixture before the water has been removed.

52. An article of manufacture for storing, dispensing, packaging, or portioning food or beverage products as defined in claim 1, wherein the matrix comprises means for increasing the insulative properties of the article of manufacture.

53. An article of manufacture for storing, dispensing, packaging, or portioning food or beverage products as defined in claim 52, wherein the means for increasing the insulative properties of the article of manufacture comprises a discontinuous, nonagglomerated phase within the matrix which includes finely dispersed voids.

54. An article of manufacture for storing, dispensing, packaging, or portioning food or beverage products as defined in claim 53, wherein the hydrated mixture comprises an air entraining agent that aids in the incorporation of finely dispersed air voids within the hydrated mixture when mixed.

55. An article of manufacture for storing, dispensing, packaging, or portioning food or beverage products as defined in claim 54, wherein the air entraining agent comprises a surfactant.

56. An article of manufacture for storing, dispensing, packaging, or portioning food or beverage products as defined in claim 54, wherein the air entraining agent comprises a synthetic liquid anionic biodegradable solution.

57. An article of manufacture for storing, dispensing, packaging, or portioning food or beverage products as defined in claim 54, wherein the air entraining agent comprises a polypeptide alkylene polyol.

58. An article of manufacture for storing, dispensing, packaging, or portioning food or beverage products as defined in claim 52, wherein the means for increasing the insulative properties of the article of manufacture comprises an aggregate material that contains a substantial amount of entrapped interstitial air voids.

59. An article of manufacture for storing, dispensing, packaging, or portioning food or beverage products as defined in claim 58, wherein the aggregate material containing entrapped interstitial air voids comprises hollow glass spheres.

60. An article of manufacture for storing, dispensing, packaging, or portioning food or beverage products as defined in claim 58, wherein the aggregate material containing entrapped interstitial air voids comprises perlite.

61. An article of manufacture for storing, dispensing, packaging, or portioning food or beverage products as defined in claim 58, wherein the aggregate material containing entrapped interstitial air voids comprises vermiculite.

62. An article of manufacture for storing, dispensing, packaging, or portioning food or beverage products as defined in claim 58, wherein the aggregate material containing entrapped interstitial air voids is selected from the group consisting of exfoliated rock, pumice, lightweight concrete, expanded fly ash, expanded slag, cork, porous ceramic spheres, aerogels, and mixtures or derivatives thereof.

63. An article of manufacture for storing, dispensing, packaging, or portioning food or beverage products as defined in claim 1, wherein the article of manufacture is in the shape of a drinking cup.

64. An article of manufacture for storing, dispensing, packaging, or portioning food or beverage products as defined in claim 63, wherein the article of manufacture in the shape of a drinking cup has sufficient strength and insulative properties to be capable of use in serving beverages which have a temperature of up to 88° C., wherein the temperature on an outer wall of the article of manufacture remains below about 52° C.

65. An article of manufacture for storing, dispensing, packaging, or portioning food or beverage products as defined in claim 63, wherein the article of manufacture in the shape of a drinking cup has sufficient strength and insulative properties capable of maintaining beverages at a temperature of below about 15° C.

66. An article of manufacture for storing, dispensing, packaging, or portioning food or beverage products as defined in claim 63, wherein the article of manufacture in the shape of a drinking cup is manufactured for single service use.

67. An article of manufacture for storing, dispensing, packaging, or portioning food or beverage products as defined in claim 64, wherein the article of manufacture in the shape of a drinking cup is manufactured for single service use.

68. An article of manufacture for storing, dispensing, packaging, or portioning food or beverage products as defined in claim 65, wherein the article of manufacture in the shape of a drinking cup is manufactured for single service use.

69. An article of manufacture for storing, dispensing, packaging, or portioning food or beverage products as defined in claim 1, wherein the article of manufacture is in the shape of a clam-shell container.

70. An article of manufacture for storing, dispensing, packaging, or portioning food or beverage products as defined in claim 69, wherein the matrix of the article of manufacture in the shape of a clam-shell container has sufficient strength and insulative properties capable of maintaining food products at a temperature of below about 0° C.

71. An article of manufacture for storing, dispensing, packaging, or portioning food or beverage products as defined in claim 69, wherein the matrix of the article of manufacture in the shape of a clam-shell container has sufficient strength and insulative properties capable of maintaining food products at a temperature of at least 25° C.

72. An article of manufacture for storing, dispensing, packaging, or portioning food or beverage products as defined in claim 69, wherein the matrix of the article of manufacture in the shape of a clam-shell container is manufactured for single service use.

73. An article of manufacture for storing, dispensing, packaging, or portioning food or beverage products as defined in claim 70, wherein the matrix of the article of manufacture in the shape of a clam-shell container is manufactured for single service use.

74. An article of manufacture for storing, dispensing, packaging, or portioning food or beverage products as defined in claim 71, wherein the matrix of the article of manufacture in the shape of a clam-shell container is manufactured for single service use.

75. An article of manufacture for storing, dispensing, packaging, or portioning food or beverage products as defined in claim 1, wherein the weight of the article of manufacture is less than the weight of the food or beverage product that it is designed to contain based upon volume.

76. An article of manufacture for storing, dispensing, packaging, or portioning food or beverage products as defined in claim 1, wherein the weight of the article of manufacture is less than one-fourth of the weight of the food or beverage product that it is designed to contain based upon volume.

77. An article of manufacture for storing, dispensing, packaging, or portioning food or beverage products as defined in claim 1, wherein the weight of the article of manufacture is less than one-tenth of the weight of the food or beverage product that it is designed to contain based upon volume.

78. An article of manufacture for storing, dispensing, packaging, or portioning food or beverage products as defined in claim 1, wherein the article of manufacture is in the shape of a straw through which liquid can pass.

79. An article of manufacture for storing, dispensing, packaging, or portioning food or beverage products as defined in claim 1, wherein the article of manufacture is in the shape of a lid for a container.

80. An article of manufacture for storing, dispensing, packaging, or ponnioning food or beverage products as defined in claim 1, wherein the article of manufacture is in the shape of a box.

81. An article of manufacture for storing, dispensing, packaging, or portioning food or beverage products as defined in claim 1, wherein the article of manufacture is in the shape of an egg carton.

82. An article of manufacture for storing, dispensing, packaging, or portioning food or beverage products as defined in claim 1, wherein the article of manufacture is in the shape of an article selected from the group consisting of a cup, jar, bottle, carton, case, crate, dish, and plate.

83. An article of manufacture for storing, dispensing, packaging, or portioning food or beverage products as defined in claim 1, wherein the matrix comprises a lightweight product.

84. An article of manufacture for storing, dispensing, packaging, or portioning food or beverage products as defined in claim 83, wherein the organic binder within the hydrated mixture has a concentration in a range from about 0.25% to about 10% by weight of the hydrated mixture before the water has been removed.

85. An article of manufacture for storing, dispensing, packaging, or portioning food or beverage products as defined in claim 84, wherein the organic binder within the hydrated mixture has a concentration in a range from about 0.5% to about 5% by weight of the hydrated mixture before the water has been removed.

86. An article of manufacture for storing, dispensing, packaging, or portioning food or beverage products as defined in claim 83, wherein the water within the hydrated mixture has a concentration in a range from about 50% to about 80% by volume of the hydrated mixture before the water has been removed.

87. An article of manufacture for storing, dispensing, packaging, or portioning food or beverage products as defined in claim 83, wherein the water within the hydrated mixture has a concentration in a range from about 60% to about 75% by volume of the hydrated mixture before the water has been removed.

88. An article of manufacture for storing, dispensing, packaging, or portioning food or beverage products as defined in claim 1, wherein the matrix comprises a high density product.

89. An article of manufacture for storing, dispensing, packaging, or portioning food or beverage products as defined in claim 88, wherein the organic binder within the hydrated mixture has a concentration in a range from about 0.25% to about 20% by weight of the hydrated mixture before the water has been removed.

90. An article of manufacture for storing, dispensing, packaging, or portioning food or beverage products as defined in claim 88, wherein the organic binder within the hydrated mixture has a concentration in a range from about 0.5 % to about 10% by weight of the hydrated mixture before the water has been removed.

91. An article of manufacture for storing, dispensing, packaging, or portioning food or beverage products as defined in claim 88, wherein the organic binder within the hydrated mixture has a concentration in a range from about 1% to about 6% by weight of the hydrated mixture before the water has been removed.

92. An article of manufacture for storing, dispensing, packaging, or portioning food or beverage products as defined in claim 88, wherein the water within the hydrated mixture has a concentration in a range from about 10% to about 45% by volume of the hydrated mixture before the water has been removed.

93. An article of manufacture for storing, dispensing, packaging, or portioning food or beverage products as defined in claim 88, wherein the water within the hydrated mixture has a concentration in a range from about 20% to about 35% by volume of the hydrated mixture before the water has been removed.

94. An article of manufacture for storing, dispensing, packaging, or portioning food or beverage products as defined in claim 1, wherein the matrix comprises both a high density and a lightweight portion.

95. An article of manufacture for storing, dispensing, packaging, or portioning food or beverage products as defined in claim 94, wherein the organic binder within the hydrated mixture has a concentration in a range from about 0.25% to about 10% by weight of the hydrated mixture before the water has been removed.

96. An article of manufacture for storing, dispensing, packaging, or portioning food or beverage products as defined in claim 94, wherein the organic binder within the hydrated mixture has a concentration in a range from about 0.5% to about 5% by weight of the hydrated mixture before the water has been removed.

97. An article of manufacture for storing, dispensing, packaging, or portioning food or beverage products as defined in claim 94, wherein the water within the hydrated mixture has a concentration in a range from about 50% to about 80% by volume of the hydrated mixture before the water has been removed.

98. An article of manufacture for storing, dispensing, packaging, or portioning food or beverage products as defined in claim 94, wherein the water within the hydrated mixture has a concentration in a range from about 60% to about 75% by volume of the hydrated mixture before the water has been removed.

99. An article of manufacture for storing, dispensing, packaging, or portioning food or beverage products as defined in claim 21, wherein the hollow glass spheres within the matrix have an average diameter of less than about 1 mm.

100. An article of manufacture for storing, dispensing, packaging, or portioning food or beverage products as defined in claim 21, wherein the hollow glass spheres within the matrix comprise individual spheres having a plurality of average diameters.

101. An article of manufacture for storing, dispensing, packaging, or portioning food or beverage products as defined in claim 100, wherein the hollow glass spheres within the matrix are selected to maximize the particle packing density of the hollow glass spheres.

102. An article of manufacture for storing, dispensing, packaging, or portioning food or beverage products as defined in claim 54, wherein the hydrated mixture comprises a stabilizing agent for maintaining the entrainment of air within the matrix.

103. An article of manufacture for storing, dispensing, packaging, or portioning food or beverage products as defined in claim 102, wherein the stabilizing agent comprises vinsol resin.

104. An article of manufacture for storing, dispensing, packaging, or portioning food or beverage products as defined in claim 53, wherein the hydrated mixture comprises a strong base and a material which reacts with the strong base to produce a gas in order to incorporate voids into the matrix.

105. An article of manufacture for storing, dispensing, packaging, or portioning food or beverage products as defined in claim 104, wherein the material which reacts with the strong base comprises a metal which is easily oxidized in the presence of a strong base.

106. An article of manufacture for storing, dispensing, packaging, or portioning food or beverage products as defined in claim 105, wherein the metal comprises aluminum.

107. An article of manufacture for storing, dispensing, packaging, or portioning food or beverage products as defined in claim 105, wherein the metal comprises zinc.

108. An article of manufacture for storing, dispensing, packaging, or portioning food or beverage products as defined in claim 104, wherein the strong base comprises sodium hydroxide.

109. An article of manufacture for storing, dispensing, packaging, or portioning food or beverage products as defined in claim 1, the matrix having a density less than about 1 g/cm$^3$.

110. An article of manufacture for storing, dispensing, packaging, or portioning food or beverage products as defined in claim 1, wherein the matrix of aggregate and organic binder has a strength to bulk density ratio greater than about 10 MPa·cm$^3$/g.

111. An article of manufacture for storing, dispensing, packaging, or portioning food or beverage products as defined in claim 1, wherein the matrix includes greater than about 50% inorganic aggregate material by weight of the matrix.

112. An article of manufacture for storing, dispensing, packaging, or portioning food or beverage products as defined in claim 1, wherein the matrix includes greater than about 70% inorganic aggregate material by weight of the matrix.

113. An article of manufacture for storing, dispensing, packaging, or portioning food or beverage products as defined in claim 1, wherein the hydrated mixture further includes an organic aggregate material selected from the group consisting of seeds, starch granules, cork, solid gelatin material, solid agar materials, and mixtures or derivatives thereof.

114. An article of manufacture for storing, dispensing, packaging, or portioning food or beverage products comprising a container having a matrix including a substantially homogeneous mixture of aggregate and organic binder, the matrix of the container formed by removing a substantial quantity of water by evaporation from a hydrated mixture comprising:
  an organic binder selected from the group consisting of polysaccharides, proteins, and mixtures or derivatives thereof and having a concentration in a range from about 0.25% to about 20% by weight of the hydrated mixture;
  optionally fibers;
  water having a concentration in a range from about 10% to about 80% by volume of the hydrated mixture; and
  an inorganic aggregate material having a concentration in a range from about 40% to about 95% by weight of solids in the hydrated mixture,
  wherein the matrix of aggregate and organic binder of the container for storing, dispensing, packaging, or portioning food or beverage products has a density less than about 1.5 g/cm$^3$ and a thickness less than about 3 mm and degrades after prolonged exposure to water, wherein the fibers are substantially homogeneously dispersed throughout the matrix of aggregate and organic binder.

115. An article of manufacture for storing, dispensing, packaging, or portioning food or beverage products as defined in claim 114, the hydrated mixture comprising the fibers having a concentration in a range of from about 0.5% to about 10% by volume of the hydrated mixture before the water has been removed.

116. An article of manufacture for storing, dispensing, packaging, or portioning food or beverage products as defined in claim 114, the hydrated mixture comprising the fibers having a concentration in a range of from about 1% to about 6% by volume of the hydrated mixture before the water has been removed.

117. An article of manufacture for storing, dispensing, packaging, or portioning food or beverage products as defined in claim 114, wherein the matrix comprises discontinuous, nonagglomerated phase which includes finely dispersed voids.

118. An article of manufacture for storing, dispensing, packaging, or portioning food or beverage products as defined in claim 117, wherein the hydrated mixture comprises an air entraining agent that aids in the incorporation of finely dispersed air voids within the hydrated mixture when mixed.

119. An article of manufacture for storing, dispensing, packaging, or portioning food or beverage products as defined in claim 118, wherein the air entraining agent comprises a surfactant.

120. An article of manufacture for storing, dispensing, packaging, or portioning food or beverage products as defined in claim 118, wherein the air entraining agent comprises a synthetic liquid anionic biodegradable solution.

121. An article of manufacture for storing, dispensing, packaging, or portioning food or beverage products as defined in claim 118, wherein the air entraining agent comprises a polypeptide alkylene polyol.

122. An article of manufacture for storing, dispensing, packaging, or portioning food or beverage products as defined in claim 117, wherein the hydrated mixture comprises a strong base and a metal which reacts with the strong base to a gas, the gas being incorporated into the hydrated mixture as finely dispersed voids.

123. An article of manufacture for storing, dispensing, packaging, or portioning food or beverage products as defined in claim 122, wherein the metal comprises aluminum.

124. An article of manufacture for storing, dispensing, packaging, or portioning food or beverage products as defined in claim 122, wherein the metal comprises zinc.

125. An article of manufacture for storing, dispensing, packaging, or portioning food or beverage products as defined in claim 122, wherein the strong base comprises sodium hydroxide.

126. An article of manufacture for storing, dispensing, packaging, or portioning food or beverage products as defined in claim 114, wherein the polysaccharide comprises a cellulose-based material.

127. An article of manufacture for storing, dispensing, packaging, or portioning food or beverage products as defined in claim 126, wherein the cellulose-based material is selected from the group consisting of hydroxymethylethylcellulose, methylcellulose, hydroxyethylcellulose, ethylcellulose, hydroxyethylpropylcellulose, and mixtures or derivatives thereof.

128. An article of manufacture for storing, dispensing, packaging, or portioning food or beverage products as defined in claim 126, wherein the cellulose-based material comprises methylhydroxyethylcellulose.

129. An article of manufacture for storing, dispensing, packaging, or portioning food or beverage products as defined in claim 128, wherein a 2% solution of the methylhydroxyethylcellulose in water has a viscosity in a range from between about 4,000 cps to about 30,000 cps measured at 20° C.

130. An article of manufacture for storing, dispensing, packaging, or portioning food or beverage products as defined in claim 126, wherein the cellulose-based material comprises carboxymethylcellulose.

131. An article of manufacture for storing, dispensing, packaging, or portioning food or beverage products as defined in claim 114, wherein the polysaccharide comprises a starch-based material.

132. An article of manufacture for storing, dispensing, packaging, or portioning food or beverage products as defined in claim 131, wherein the starch-based material is selected from the group consisting of starch acetates, starch hydroxyethyl ethers, ionic starches, long-chain alkyl starches, dextrins, amine starches, phosphate starches, dialdehyde starches, and mixtures or derivatives thereof.

133. An article of manufacture for storing, dispensing, packaging, or portioning food or beverage products as defined in claim 131, wherein the starch-based material comprises amylopectin, or a derivative thereof.

134. An article of manufacture for storing, dispensing, packaging, or portioning food or beverage products as defined in claim 131, wherein the starch-based material comprises amylose, or a derivative thereof.

135. An article of manufacture for storing, dispensing, packaging, or portioning food or beverage products as defined in claim 131, wherein the starch-based material comprises sea gel, or a derivative thereof.

136. An article of manufacture for storing, dispensing, packaging, or portioning food or beverage products as defined in claim 114, wherein the polysaccharide is selected from the group consisting of alginic acid, phycocolloids, agar, gum arabic, guar gum, locust bean gum, gum karaya, gum tragacanth, and mixtures or derivatives thereof.

137. An article of manufacture for storing, dispensing, packaging, or portioning food or beverage products as defined in claim 114, wherein the protein is selected from the group consisting of gelatin, glue, casein, and mixtures or derivatives thereof.

138. An article of manufacture for storing, dispensing, packaging, or portioning food or beverage products as defined in claim 114, wherein the protein comprises a prolamine.

139. An article of manufacture for storing, dispensing, packaging, or portioning food or beverage products as defined in claim 114, wherein the aggregate material comprises hollow glass spheres.

140. An article of manufacture for storing, dispensing, packaging, or portioning food or beverage products as defined in claim 114, wherein the matrix of aggregate and organic binder has a density of less than about 1 g/cm$^3$.

141. An article of manufacture for storing, dispensing, packaging, or portioning food or beverage products as defined in claim 117, wherein the matrix of aggregate and organic binder has a density of less than about 1 g/cm$^3$.

142. An article of manufacture for storing, dispensing, packaging, or portioning food or beverage products as defined in claim 114, wherein the hydrated mixture further includes an organic aggregate material comprising starch granules.

143. An article of manufacture for storing, dispensing, packaging, or portioning food or beverage products as defined in claim 114, wherein the inorganic aggregate material includes calcium carbonate.

144. An article of manufacture for storing, dispensing, packaging, or portioning food or beverage products as defined in claim 114, wherein the inorganic aggregate material includes gypsum.

145. An article of manufacture for storing, dispensing, packaging, or portioning food or beverage products as defined in claim 114, wherein the polysaccharide comprises starch.

146. An article of manufacture for storing, dispensing, packaging or portioning food or beverage products comprising a container having a matrix including a substantially homogeneous mixture of aggregate and organic binder, the matrix of aggregate and organic binder formed by removing a substantial quantity of water through evaporation from a hydrated mixture comprising an organic binder selected from the group consisting of polysaccharides, proteins, and mixtures or derivatives thereof, water, optionally fibers, and an inorganic aggregate material included in an amount such that the hydrated mixture yields a matrix of aggregate and organic binder having an inorganic aggregate material concentration greater than about 40% by weight of the matrix, wherein the matrix of the container for storing, dispensing, packaging or portioning food or beverage products has a density less than about 1 g/cm$^3$ and a thickness less than about 3 mm and degrades after prolonged exposure to water, wherein the fibers are substantially homogeneously dispersed throughout the matrix of aggregate and organic binder.

147. An article of manufacture for storing, dispensing, packaging, or portioning food or beverage products as defined in claim 146, wherein the hydrated mixture further includes an organic aggregate material comprising starch granules.

148. An article of manufacture for storing, dispensing, packaging, or portioning food or beverage products as defined in claim 146, wherein the inorganic aggregate material includes calcium carbonate.

149. An article of manufacture for storing, dispensing, packaging, or portioning food or beverage products as defined in claim 146, wherein the inorganic aggregate material includes gypsum.

150. An article of manufacture for storing, dispensing, packaging, or portioning food or beverage products as defined in claim 146, wherein the polysaccharide comprises starch.

151. An article of manufacture for storing, dispensing, packaging or portioning food or beverage products comprising a container having a matrix reinforced with fibers, the matrix including a substantially homogeneous mixture of aggregate and organic binder, the matrix of aggregate and organic binder formed by removing a substantial quantity of water through evaporation from a hydrated mixture comprising an organic binder selected from the group consisting of polysaccharides, proteins, and mixtures or derivatives thereof, water, fibers and an inorganic aggregate material included in an amount such that the hydrated mixture yields a matrix of aggregate and organic binder having an inorganic aggregate material concentration greater than about 30% by weight of the matrix, wherein the fiber-reinforced matrix of aggregate and organic binder of the container for storing, dispensing, packaging or portioning food or beverage products has a density less than about 1.5 g/cm$^3$ and a thickness less than about 3 mm and degrades after prolonged exposure to water, the fibers being substantially homogeneously dispersed throughout the matrix of aggregate and organic binder.

152. An article of manufacture for storing, dispensing, packaging, or portioning food or beverage products as defined in claim 151, wherein the hydrated mixture further includes an organic aggregate material comprising starch granules.

153. An article of manufacture for storing, dispensing, packaging, or portioning food or beverage products as defined in claim 151, wherein the inorganic aggregate material includes calcium carbonate.

154. An article of manufacture for storing, dispensing, packaging, or portioning food or beverage products as defined in claim 151, wherein the inorganic aggregate material includes gypsum.

155. An article of manufacture for storing, dispensing, packaging, or portioning food or beverage products as defined in claim 151, wherein the polysaccharide comprises starch.

156. An article of manufacture comprising a container for storing, dispensing, packaging or portioning food or beverage products having a matrix reinforced with fibers, the matrix including a substantially homogeneous mixture of aggregate and organic binder, the container formed by removing a substantial quantity of water through evaporation from a hydrated mixture comprising a polysaccharide binder, a fibrous material, and an inorganic aggregate material having a concentration in a range from about 40% to about 95% by weight of solids in the hydrated mixture, the matrix of aggregate and organic binder having a density less than about 1.5 g/cm$^3$, a thickness less than about 3 mm, and fibers substantially homogeneously dispersed throughout the matrix of aggregate and organic binder, wherein the matrix degrades after prolonged exposure to water.

157. An article of manufacture for storing, dispensing, packaging, or portioning food or beverage products as defined in claim 156, wherein the hydrated mixture further includes an organic aggregate material comprising starch granules.

158. An article of manufacture for storing, dispensing, packaging, or portioning food or beverage products as defined in claim 156, wherein the inorganic aggregate material includes calcium carbonate.

159. An article of manufacture for storing, dispensing, packaging, or portioning food or beverage products as defined in claim 156, wherein the inorganic aggregate material includes gypsum.

160. An article of manufacture for storing, dispensing, packaging, or portioning food or beverage products as defined in claim 156, wherein the polysaccharide comprises starch.

161. An article of manufacture for storing, dispensing, packaging, or portioning food or beverage products comprising a container having a matrix reinforced with fibers, the matrix comprising a substantially homogeneous mixture of aggregate and organic binder, the matrix of the container formed by removing a substantial quantity of water by evaporation from a hydrated mixture comprising an organic binder selected from the group consisting of polysaccharides, proteins, and mixtures or derivatives thereof, water, fibers, and an inorganic aggregate material, the aggregate material having a concentration greater than about 70% by weight of solids in the matrix, wherein the fiber-reinforced matrix of aggregate and organic binder of the container for storing, dispensing, packaging, or portioning food or beverage products has a density less than about 1.5 g/cm$^3$ and degrades after prolonged exposure to water, and wherein the fibers are substantially homogeneously dispersed throughout the matrix of aggregate and organic binder.

\* \* \* \* \*

UNITED STATES PATENT AND TRADEMARK OFFICE
CERTIFICATE OF CORRECTION

PATENT NO. : 5,580,624
DATED : December 3, 1996
INVENTOR(S) : Per Just Andersen, Ph.D. and Simon K. Hodson It is certified that error appears in the above-indentified patent and that said Letters Patent is hereby corrected as shown below:

IN THE TITLE:

In the third line of the title, change "POLYSHACCARIDE" to --POLYSACCHARIDE--.

In the section entitled "References Cited" (Item No. 56), under the subsection heading entitled "U.S. PATENT DOCUMENTS", on page 1, first column, under U.S. Patent No. 1,234,692, change "Ignacy" to --Ignacyr--.

On page 2, first column, under U.S. Patent No. 3,579,366 change "Rehmar" to --Rehmard--.

On page 3, first column, under U.S. Patent No. 4,789,913 to Dunton, change the reference to --4,789,244   12/1988   Dunton et al.--.

On page 3, second column, under U.S. Patent No. 5,089,198, change "Leach" to --Leach, deceased--.

On page 4, first column, under the subsection heading entitled "FOREIGN PATENT DOCUMENTS", under reference number "4-70304", change "of 0000  Japan" to --3/92  Japan--; in the immediately following reference number "2-190304", change "of 0000  Japan" to --7/90  Japan--.

On page 5, second column, under the subsection "OTHER PUBLICATIONS" under the "Roy et al." reference, change "Mrs." to --MRS--.

UNITED STATES PATENT AND TRADEMARK OFFICE
CERTIFICATE OF CORRECTION

PATENT NO. : 5,580,624

DATED : December 3, 1996

INVENTOR(S) : Per Just Andersen, Ph.D. and Simon K. Hodson

It is certified that error appears in the above-indentified patent and that said Letters Patent is hereby corrected as shown below:

On page 5, second column, in the "Samuel" reference, change "Innocative" to --Innovative--.

At col. 1, line 25, after "packaging" insert --of--.

At col. 1, lines 29-36, delete the text "2. Related Application . . . (now abandoned)."

At col. 1, line 37, change "3." to --2.--.

At col. 17, line 56, after "strengtheners," delete "including".

At col. 19, line 63, before "P.J." change "Anderson" to --Andersen--.

At col. 20, line 9, before "hollow glass" change "courser" to --coarser--.

At col. 25, line 61, after "fibers" change result to --results--.

At col. 26, line 58, change "theology" to --rheology--.

At col. 28, line 36, after "introduction of" change "aid" to --air--.

At col. 29, line 44, after "Example" insert --2--.

At col. 29, line 55, before "(0.422" change "course" to --coarse--.

At col. 31, line 35, before "were" change "course" to --coarse--.

At col. 31, line 58, change "as" to --and--.

UNITED STATES PATENT AND TRADEMARK OFFICE
CERTIFICATE OF CORRECTION

PATENT NO. : 5,580,624

DATED : December 3, 1996

INVENTOR(S) : Per Just Andersen, Ph.D. and Simon K. Hodson

It is certified that error appears in the above-indentified patent and that said Letters Patent is hereby corrected as shown below:

At col. 32, line 16, change "as" to --and--.

At col. 32, line 40, change "as" to --and--.

Signed and Sealed this

Twenty-second Day of April, 1997

Attest:

BRUCE LEHMAN

*Commissioner of Patents and Trademarks*

*Attesting Officer*